US010193199B2

(12) United States Patent
Frohnmayer et al.

(10) Patent No.: US 10,193,199 B2
(45) Date of Patent: Jan. 29, 2019

(54) BATTERY SYSTEM

(71) Applicant: ARCIMOTO, INC., Eugene, OR (US)

(72) Inventors: Mark Douglas Frohnmayer, Eugene, OR (US); David Boyd, Portland, OR (US)

(73) Assignee: ARCIMOTO, INC., Eugene, OR (US)

( * ) Notice: Subject to any disclaimer, the term of this patent is extended or adjusted under 35 U.S.C. 154(b) by 347 days.

(21) Appl. No.: 14/954,650

(22) Filed: Nov. 30, 2015

(65) Prior Publication Data

US 2016/0211559 A1   Jul. 21, 2016

Related U.S. Application Data

(60) Provisional application No. 62/085,610, filed on Nov. 30, 2014, provisional application No. 62/205,908, filed on Aug. 17, 2015.

(51) Int. Cl.
*H01M 10/6556* (2014.01)
*H01M 2/10* (2006.01)

(52) U.S. Cl.
CPC ..... *H01M 10/6556* (2015.04); *H01M 2/1077* (2013.01); *H01M 2220/20* (2013.01)

(58) Field of Classification Search
CPC .......... H01M 10/6556; H01M 2/1077; H01M 2220/20
See application file for complete search history.

(56) References Cited

U.S. PATENT DOCUMENTS

2007/0026305 A1\* 2/2007 Jeon .................... H01M 2/1077
429/159

\* cited by examiner

*Primary Examiner* — Wyatt P McConnell
(74) *Attorney, Agent, or Firm* — Alleman Hall Creasman & Tuttle LLP

(57) ABSTRACT

A battery system is disclosed herein that includes a battery enclosure and a battery assembly contained within or substantially surrounded by the enclosure. The enclosure may include enclosure walls having fluid pathways defined therein. In an example, enclosure walls are formed from multiple instances of a repeating modular wall component. A cooling fluid may be circulated through the fluid pathways to provide thermal regulation of the battery assembly. The battery assembly may include one or more electric batteries. An example battery assembly includes a plurality of batteries that are organized into rows. These rows of batteries may be electrically interconnected with each other by electrically conductive strips to form a battery pack. The battery system may be used to provide energy storage within the context of automotive applications or other electronic systems.

14 Claims, 18 Drawing Sheets

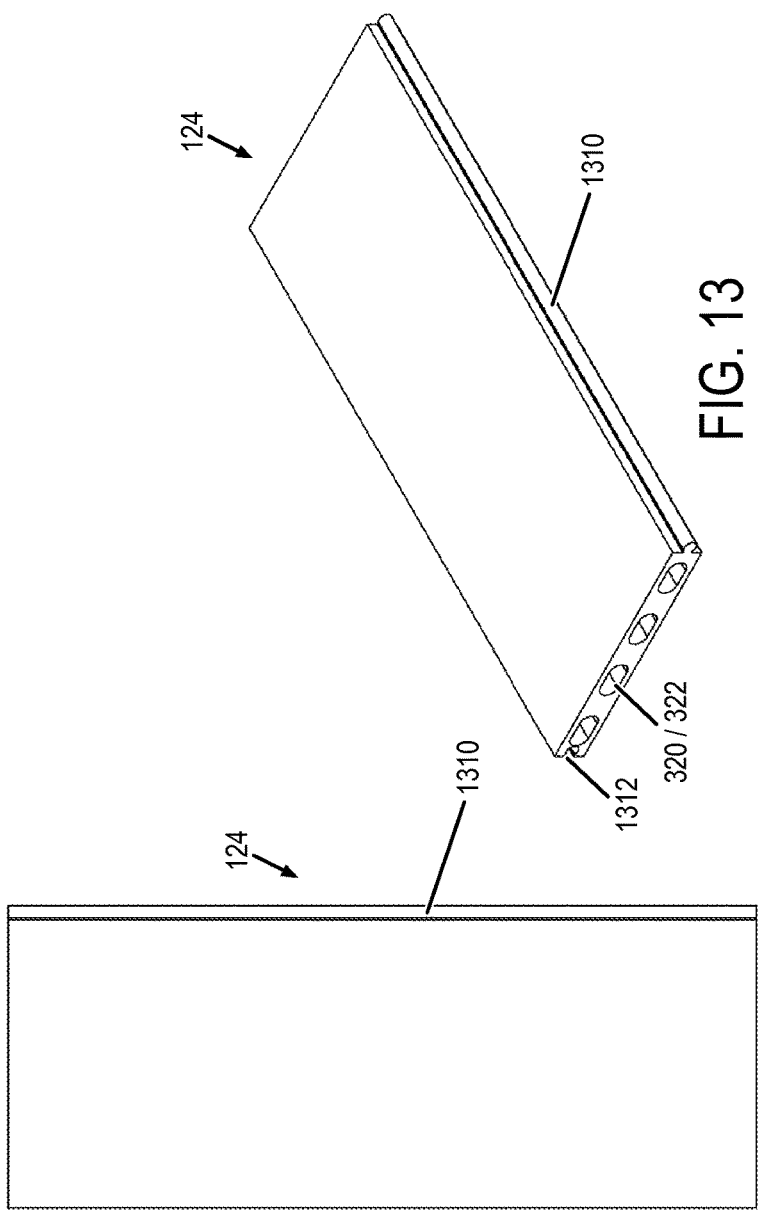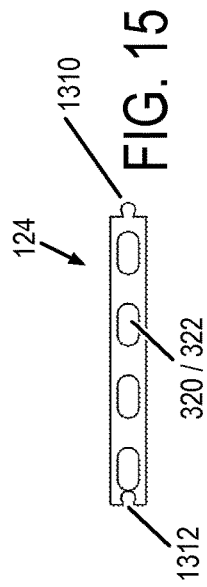

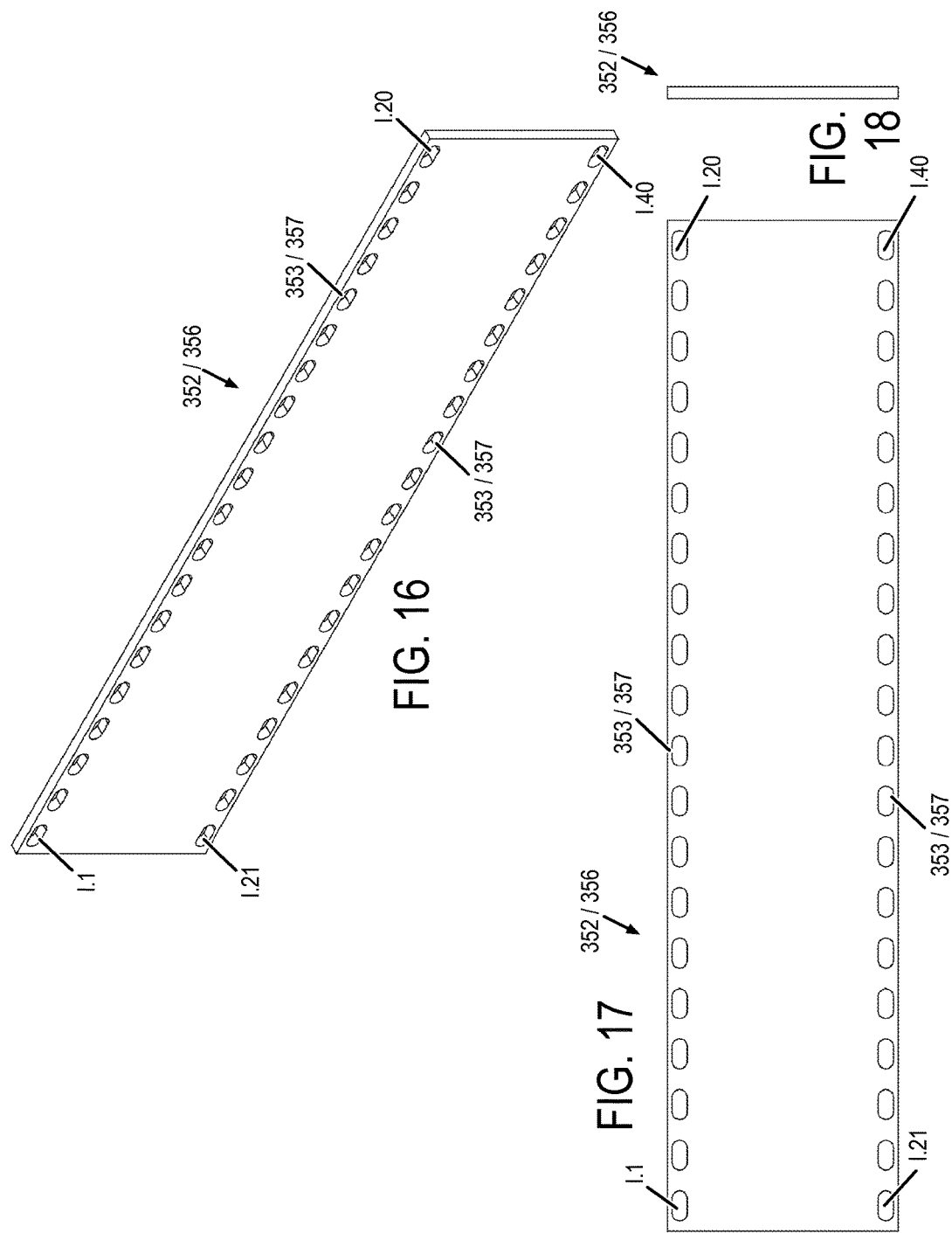

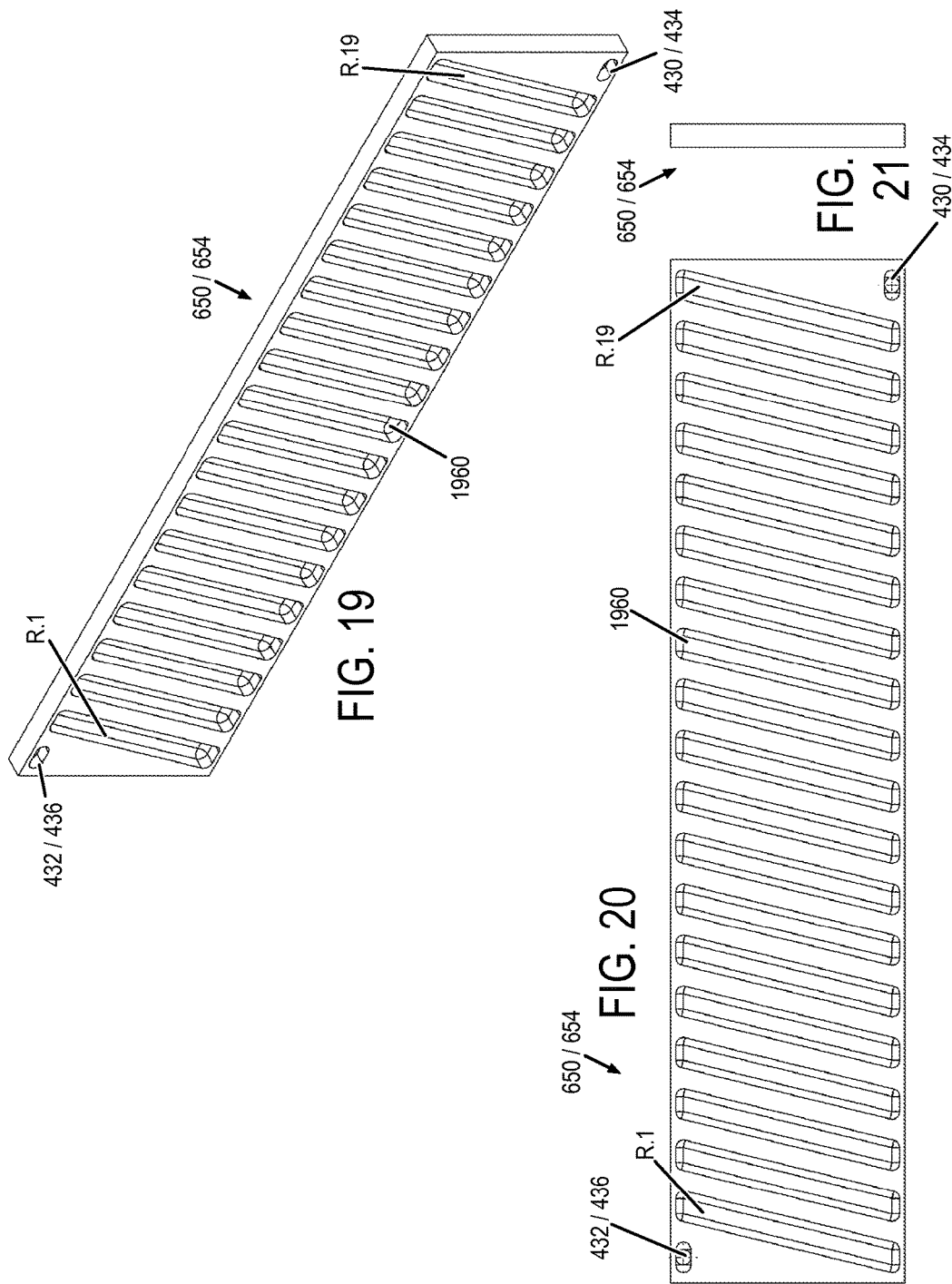

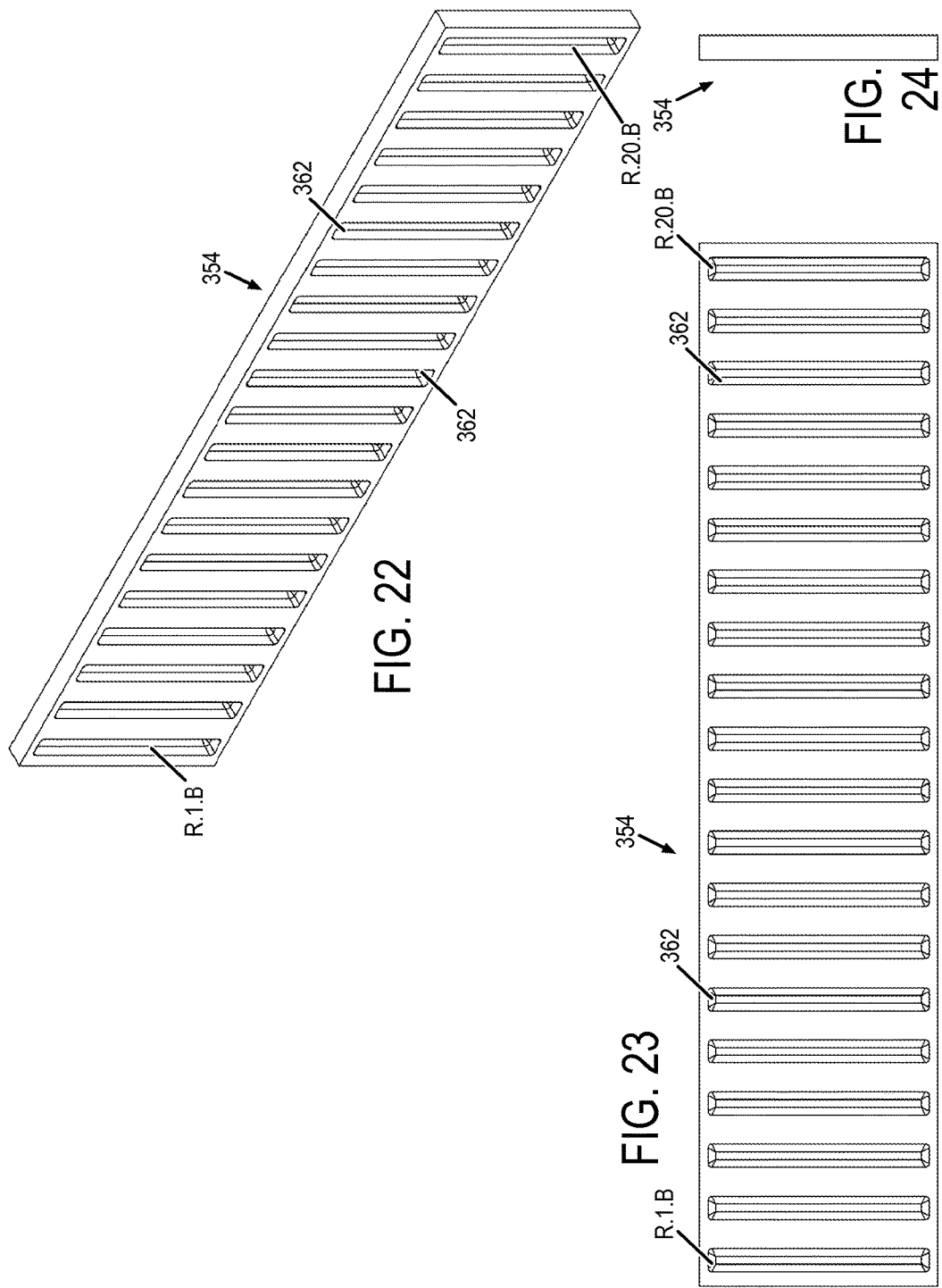

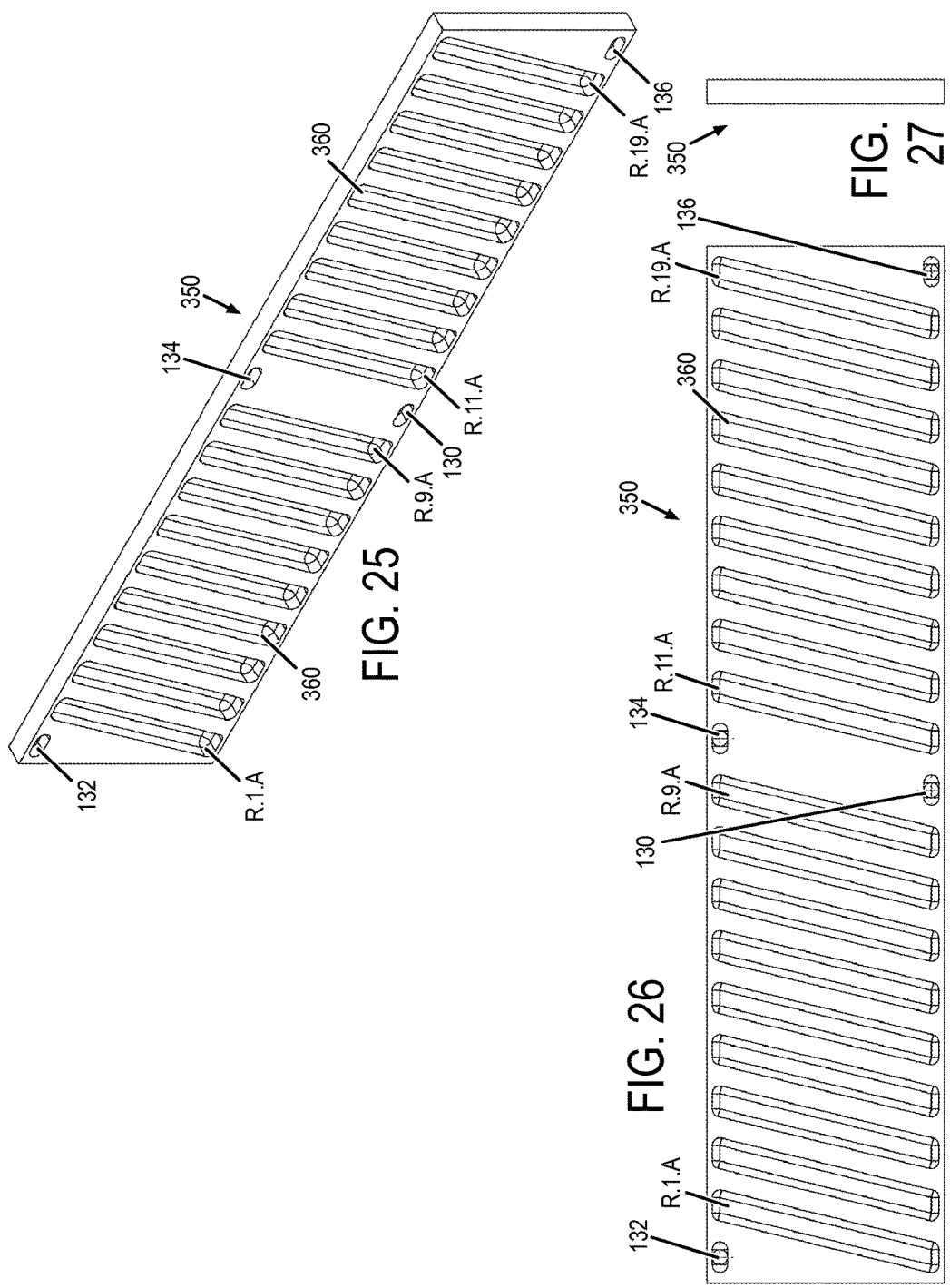

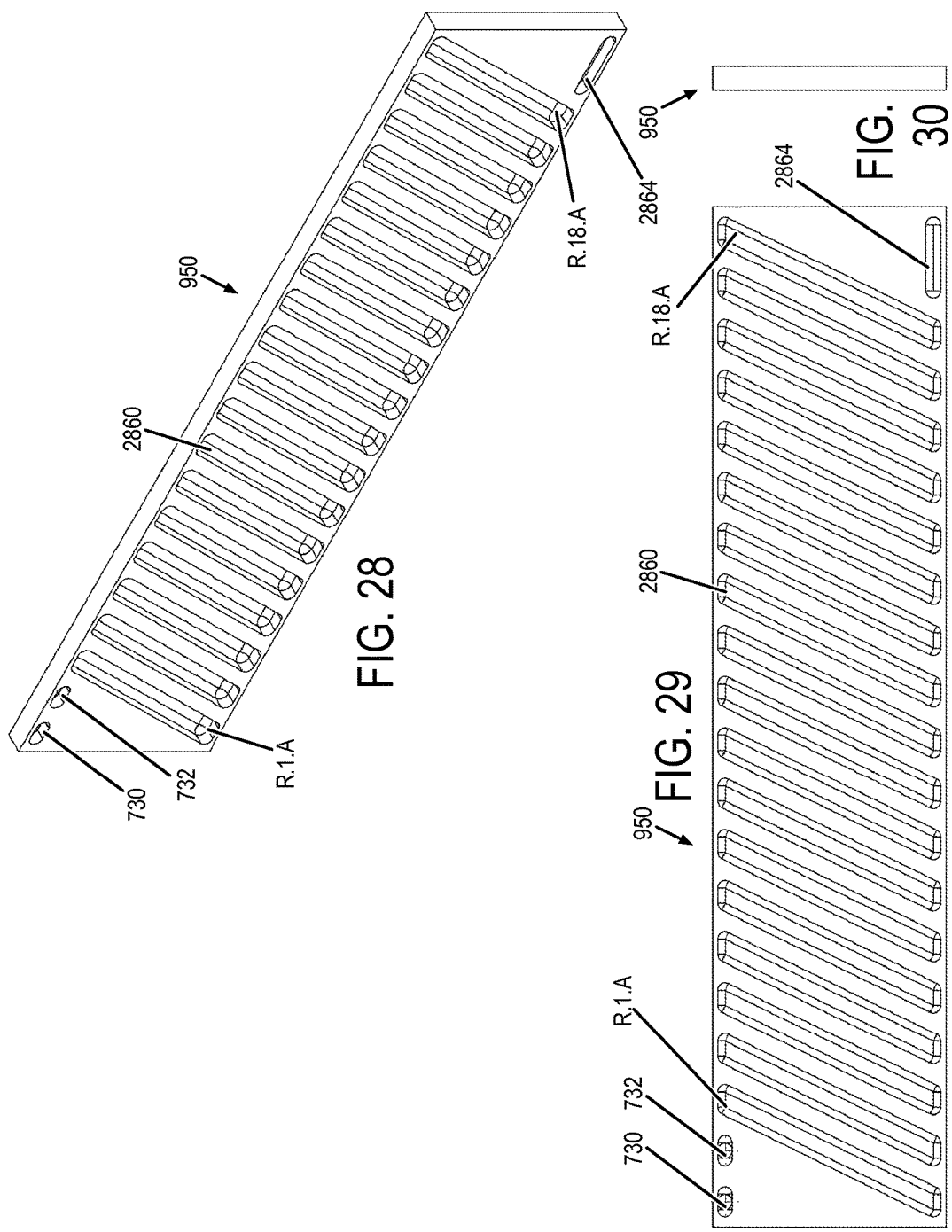

BATTERY SYSTEM

CROSS-REFERENCE TO RELATED APPLICATIONS

The present application claims the benefit of and priority to U.S. Provisional Patent Application Ser. No. 62/085,610, titled "Energy Storage System With Structurally Integrated Thermal Management", filed Nov. 30, 2014, the entire contents of which are incorporated herein by reference in their entirety for all purposes. The present application also claims the benefit of and priority to U.S. Provisional Patent Application Ser. No. 62/205,908, titled "Battery Enclosure", filed Aug. 17, 2015, the entire contents of which are incorporated herein by reference in their entirety for all purposes.

BACKGROUND

Electric vehicles and other electronic systems utilize energy storage devices often in the form of electric batteries. Lithium-ion batteries are an example of a rechargeable electric battery that is commonly used within automotive applications. Charging and discharging of electric batteries may generate heat. Excessive heat generated by or applied to electric batteries, or excessive temperature conditions, may result in reduced battery efficiency or power delivery capability, and may damage the electric batteries or other surrounding components.

SUMMARY

A battery system is disclosed herein that includes a battery enclosure and a battery assembly contained within or substantially surrounded by the enclosure. The enclosure may include enclosure walls having fluid pathways defined therein. In an example, enclosure walls are formed from multiple instances of a repeating modular wall component. A cooling fluid may be circulated through the fluid pathways to provide thermal regulation of the battery assembly. The battery assembly may include one or more electric batteries. An example battery assembly includes a plurality of batteries that are organized into rows. These rows of batteries are electrically interconnected with each other by electrically conductive strips or other suitable electrical interconnects to form a battery pack. The battery system may be used to provide energy storage within the context of automotive applications or other electronic systems. It will be appreciated that this summary describes only some of the concepts covered in greater detail by the following detailed description and associated drawings. As such, claimed subject matter is not limited to the contents of this summary.

BRIEF DESCRIPTION OF DRAWINGS

FIGS. 13-15 depict an example modular wall portion in further detail.

FIGS. 16-18 depict an example baffle plate in further detail.

FIGS. 19-30 depict example return plates in further detail.

DETAILED DESCRIPTION

A battery system is disclosed herein that includes a battery enclosure and a battery assembly contained within or substantially surrounded by the enclosure. The enclosure may include enclosure walls having fluid pathways defined therein. In an example, enclosure walls are formed from multiple instances of a repeating modular wall component. A cooling fluid may be circulated through the fluid pathways to provide thermal regulation of the battery assembly. The battery assembly may include one or more electric batteries. An example battery assembly includes a plurality of batteries that are organized into rows. These rows of batteries are electrically interconnected with each other by electrically conductive strips or other suitable electrical interconnects to form a battery pack. The battery system may be used to provide energy storage within the context of automotive applications or other electronic systems.

Figure 1:
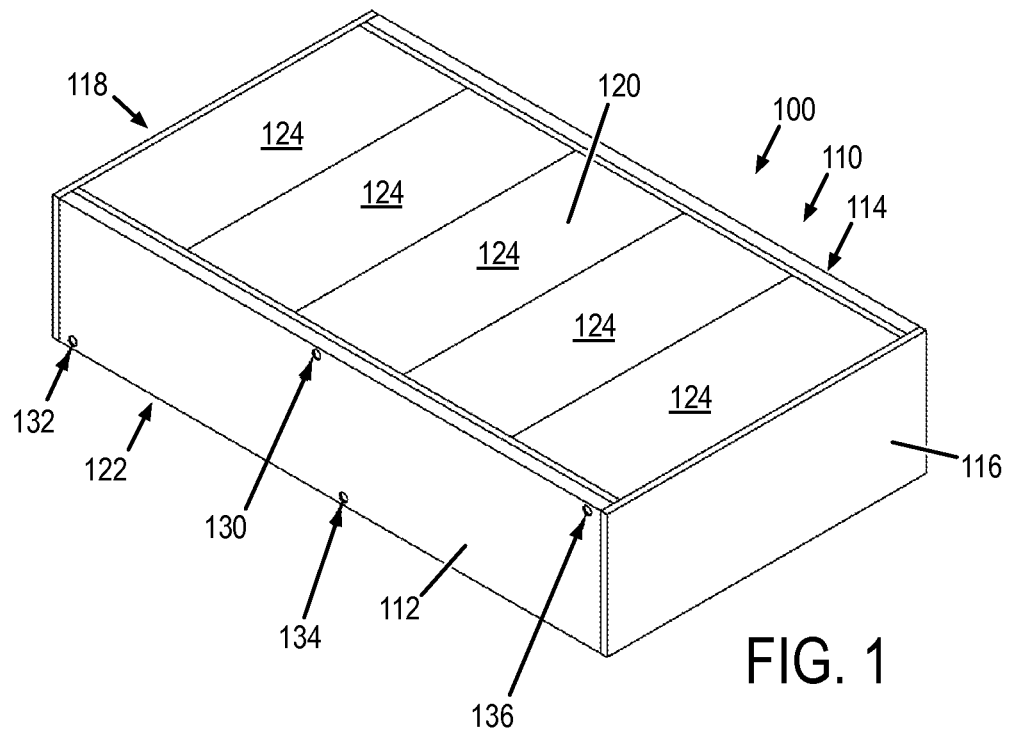
FIGS. 1-3 depict an example battery system according to a first implementation.
Figure 2:
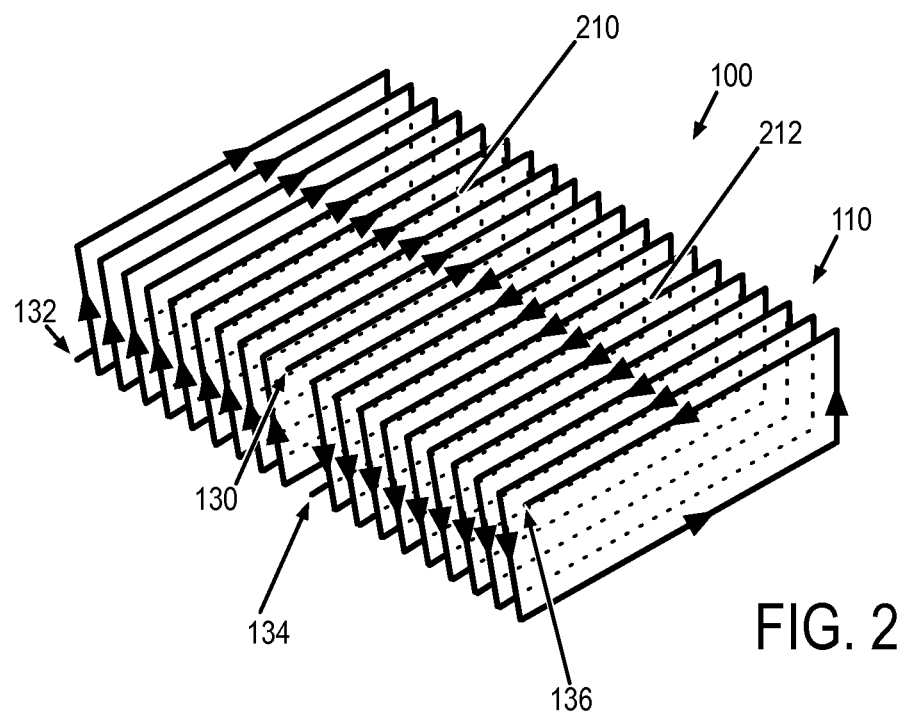
Figure 3:
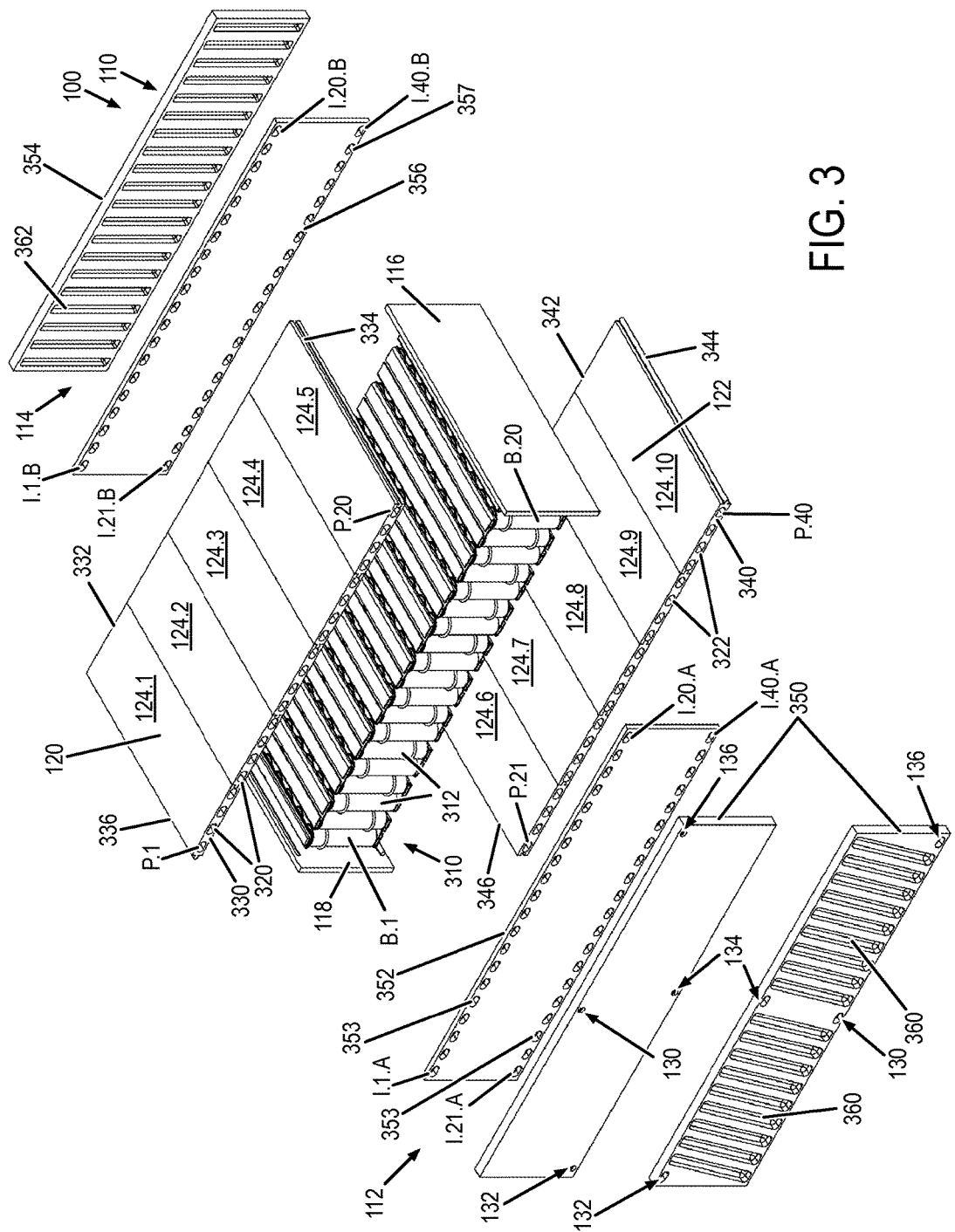

FIGS. 1-3 depict an example battery system 100 according to a first implementation. This first implementation supports dual-independent fluid flow circuits located on opposite sides of battery system 100 as depicted, for example, in FIG. 2. Battery system 100 includes a battery enclosure 110. Enclosure 110 is formed by a plurality of enclosure walls that define a battery region 310 within which one or more batteries 312 may reside, as depicted in FIG. 3, for example.

Referring to FIG. 1, enclosure 110 includes six quadrilateral walls 112, 114, 116, 118, 120, and 122 that collectively form a boxed-shaped volume. In this example, walls 112 and 114 are parallel to each other, walls 116 and 118 are parallel to each other, and walls 120 and 122 are parallel to each other. However, a battery enclosure may take other suitable forms, including volumes that have curved wall surfaces, non-parallel walls, different quantities of wall, etc.

One or more fluid inlets, and one or more corresponding fluid outlets of the battery enclosure communicate with fluid pathways formed within walls of the enclosure to define one or more fluid circuits through which a fluid may be circulated. In this example, wall 112 includes a plurality of openings formed therein, including a first fluid inlet 130 and a first fluid outlet 132 of a first fluid circuit, and a second fluid inlet 134 and a second fluid outlet 136 of a second fluid circuit.

Referring to FIG. 2, in this example, first fluid inlet 130 and first fluid outlet 132 communicate with a first set of fluid pathways formed within walls of the enclosure to collectively define a first fluid circuit 210. Also in this example, second fluid inlet 134 and second fluid outlet 136 communicate with a second set of fluid pathways formed within walls of the enclosure to collectively define a second fluid circuit 212. First fluid circuit 210 and second fluid circuit 212 are independent of each other in this example and provide independent thermal management regions of the battery assembly contained therein. For example, first and second fluid circuits 210 and 212 are located on opposite halves of enclosure 110 to provide thermal regulation of opposite halves of a battery assembly contained within enclosure 110.

FIG. 3 depicts an exploded view of battery system 100. Within FIG. 3, battery enclosure 110 includes or otherwise defines a battery region 310 that contains a battery assembly 312. Battery assembly 312 is a non-limiting example of a battery assembly that contains a plurality of batteries that are organized into rows of batteries. It will be understood that other battery assemblies may be utilized in combination with the battery enclosures disclosed herein.

FIG. 3 depicts further details of example wall configurations and fluid pathway configurations for battery enclosure 110. Within FIG. 3, wall 120 includes a first set of fluid pathways 320 defined therein, and wall 122 includes a second set of fluid pathways 322 defined therein. Fluid pathways 320 and 322 of walls 120 and 122 may be referred to as primary fluid pathways of the enclosure. Walls 120 and 122 in this example form the largest enclosure walls and provide the largest surface area surrounding and/or contacting battery assembly 312.

In this example, the first set of fluid pathways 320 of wall 12 includes twenty individual fluid pathways, labeled sequentially as P.1-P.20, that are parallel to and spaced apart from each other at equal intervals. Each fluid pathway of the first set of fluid pathways 320 passes entirely through wall 120 from a first edge 330 of wall 120 that interfaces with wall 112 to a second edge 332 of wall 120 that interfaces with wall 114. An opening of fluid pathway P.1 at first edge 330 at wall 112 side of the enclosure may be referred to herein as opening P.1.A, and an opening of fluid pathway P.1 at second edge 332 at wall 114 side of the enclosure may be referred to as opening P.1.B, with the A and B designation being applicable to each of fluid pathways 320. Also in this example, fluid pathways 320 are parallel to edges 334, 336 of wall 120 that interface with walls 116 and 118, respectively.

The second set of fluid pathways 322 also includes twenty individual fluid pathways labeled sequentially as P.21-P.40 that are parallel to and spaced apart from each other at equal intervals. The second set of fluid pathways 322 are also parallel to the first set of fluid pathways 320 in this example. Each fluid pathway of the second set of fluid pathways 322 passes entirely through wall 122 from a first edge 340 of wall 122 that interfaces with wall 112 to a second edge 342 of wall 122 that interfaces with wall 114. An opening of fluid pathway P.21 at first edge 340 at the wall 112 side of the enclosure may be referred to as opening P.21.A, and an opening of fluid pathway P.21 at second edge 342 at the wall 114 side of the enclosure may be referred to as opening P.21.B, with the A and B designation being applicable to each of fluid pathways 322. Also in this example, fluid pathways 322 are parallel to edges 344, 346 of wall 122 that interface with walls 116 and 118, respectively.

In the example depicted in FIG. 3, each individual fluid pathway of the first set of fluid pathways 320 is aligned with a corresponding individual fluid pathway of the second set of fluid pathways 322 within a plane that is parallel to walls 116 and 118. Here, each pair of aligned fluid pathways have the same offset relative to parallel edges 334/344 or 336/346. For example, fluid pathway P.1 is aligned with fluid pathway P.21, and fluid pathway P.20 is aligned with fluid pathway P.40.

The twenty individual fluid pathways of each of the first and second sets of fluid pathways 320, 322 may also be aligned with a corresponding row of batteries of battery assembly 312. For example, battery assembly 312 includes twenty rows of batteries labeled sequentially as B.1-B.20 in which each row of batteries is located between an individual fluid pathway of wall 120 and an individual fluid pathway of wall 122. For example, row B.1 is located between fluid pathways P.1 and P.21, and B.20 is located between fluid pathways P.20 and P.40. In this configuration, each row of batteries may be thermally managed on each side by a corresponding pair of primary fluid pathways of walls 120 and 122. Alignment of the fluid pathways with the batteries enables a circulating fluid to be directed to each of the batteries to provide even and/or targeted cooling of the battery assembly. In other examples, fluid pathways may be offset from rows of batteries. For example, fluid pathways may be aligned between two rows of batteries.

Also within the example depicted in FIGS. 1-3, walls 120 and 122 are each formed by a plurality of modular wall portions. In this example, five instances of a modular wall portion 124 labeled 124.1-124.5 form wall 120 and another five instances of modular wall portion 124 labeled 124.5-124.10 form wall 122. In this example, modular wall portion 124 includes four fluid pathways. However, in other examples, a modular wall portion may include one, two, three, five or more fluid pathways. The modular nature of modular wall portion 124 enables a battery enclosure to be sized for a particular battery assembly or available space for the overall battery system by increasing or decreasing a quantity of instances of modular wall portion 124 that are included in each of walls 120 and 122.

For example, if battery assembly 312 is expanded to include four additional rows of batteries, then walls 120 and 122 may be expanded to each include six wall portions having twenty-four primary fluid pathways. As another example, if battery assembly 312 is reduced in size to include four fewer rows of batteries, then walls 120 and 122 may be reduced in size to each include four wall portions having sixteen primary fluid pathways.

The modular nature of modular wall portion 124 may also reduce manufacturing cost and complexity by enabling the modular wall portion as an individual manufactured component to be repeatedly used in the construction of walls 120 and 122, as well as accommodating enclosures of varying sizes. In an example, wall portion 124 may be manufactured by extruding a material in the direction of its fluid pathways. However, other suitable manufacturing techniques may be used. In other examples, walls 120 and 122 each may be formed by an individual wall portion.

In the example depicted in FIGS. 1-3, walls 112 and 114 are each formed by a combination of a baffle plate and a return plate. For example, wall 112 is formed by a first return plate 350 and a first baffle plate 352 that is located between first return plate 350 and battery region 310. In configurations in which wall 112 includes one or more fluid inlets and/or fluid outlets, wall 112 may be referred to as a header or fluid distributor of the battery enclosure. Wall 114 is formed by a second return plate 354 and a second baffle plate 356 that is located between second return plate 354 and battery region 310. In configurations in which wall 114 includes one or more fluid inlets and/or outlets, wall 114 may be referred to as a header or fluid distributor of the battery enclosure.

Each pair of baffle and return plates collectively define a plurality of fluid pathways that connect at least some of the first set of primary fluid pathways 320 of wall 120 to the second set of primary fluid pathways 322 of wall 122. For example, first return plate 350 includes a plurality of fluid channels 360 formed within an interior face of first return plate 350 that when combined with an opposing exterior face of first baffle plate 352 forms a first set of return fluid pathways of wall 112. First return plate 350 is depicted in FIG. 3 in two different positions rotated relative to each other to provide a view of an exterior face and an interior face of first return plate 350. First return plate 350 further includes first fluid inlet 130, first fluid outlet 132, second fluid inlet 134, and second fluid outlet 136 formed therein. Second return plate 354 includes a plurality of fluid channels 362 formed within an interior face of second return plate 354 that when combined with an opposing exterior face of second baffle plate 356 forms a second set of return fluid pathways of wall 114.

FIG. 3 depicts wall 112 including eighteen return pathways and wall 114 including twenty return pathways. Baffle plates 352 and 356 are identical components in this example, and each include forty openings defined therein in which twenty openings labeled sequentially as I.1-I.20 are located along a first edge that interfaces with wall 120 and twenty openings labeled sequentially as I.21-I.40 are located along a second edge that interfaces with wall 122. An example of baffle plates 352 and 356 are described and depicted in further detail with reference to FIGS. 16-18.

Openings formed in baffle plate 352 may be designated as I.1.A-I.40.A to refer to the wall 112 side of the enclosure, and openings formed in baffle plate 354 may be designated as I.1.B-I.40.B to refer to the wall 114 side of the enclosure. Each of openings P.1.A-P.40A of primary flow pathways 320, 322 are aligned with and join each of openings I.1.A-I.40.A of baffle plate 352, respectively. Each of openings P.1.B-P.40.B of primary flow pathways 320, 322 are aligned with and join each of openings I.1.B-I.40.B of baffle plate 356, respectively.

The configuration of fluid channels, inlets, and outlets of each return plate may be used to define the fluid circuit configuration and flow characteristics of the battery enclosure. In the example depicted in FIG. 3, first return plate 350 includes first inlet 130 that joins opening I.11.A of baffle plate 352 and second inlet 134 that joins opening I.30.A of baffle plate 352. Return plate 354 has fluid pathways that receive fluid from a first primary fluid pathway and return that fluid to a second primary fluid pathway that is aligned with the first primary fluid pathway. For example, fluid that is received by return plate 354 from primary fluid pathway P.3 at opening P.3B is returned to primary fluid pathway P.23 at opening P.23B. Hence, in this example, return plate 354 maintains alignment of the fluid circuit between walls 120 and 122. An example of return plate 354 is described and depicted in further detail with reference to FIGS. 22-24.

By contrast, return plate 350 has channels 360 that are angled to transfer fluid from a first primary fluid pathway to a second primary fluid pathway of an opposing wall that neighbors the aligned primary fluid pathway. For example, fluid that is received by return plate 352 via opening P.23A is returned to opening P.2A, which neighbors opening P.3A that is aligned with P.23A. In this example, return plate 350 directs fluid entering the enclosure via first inlet 130 towards first outlet 132, and directs fluid entering the enclosure via second inlet 134 towards second outlet 136 using multiple passes through the primary fluid pathways. FIG. 2 depicts fluid flow through enclosure 110 in further detail. An example of return plate 350 is described and depicted in further detail with reference to FIGS. 25-27.

Figure 4:
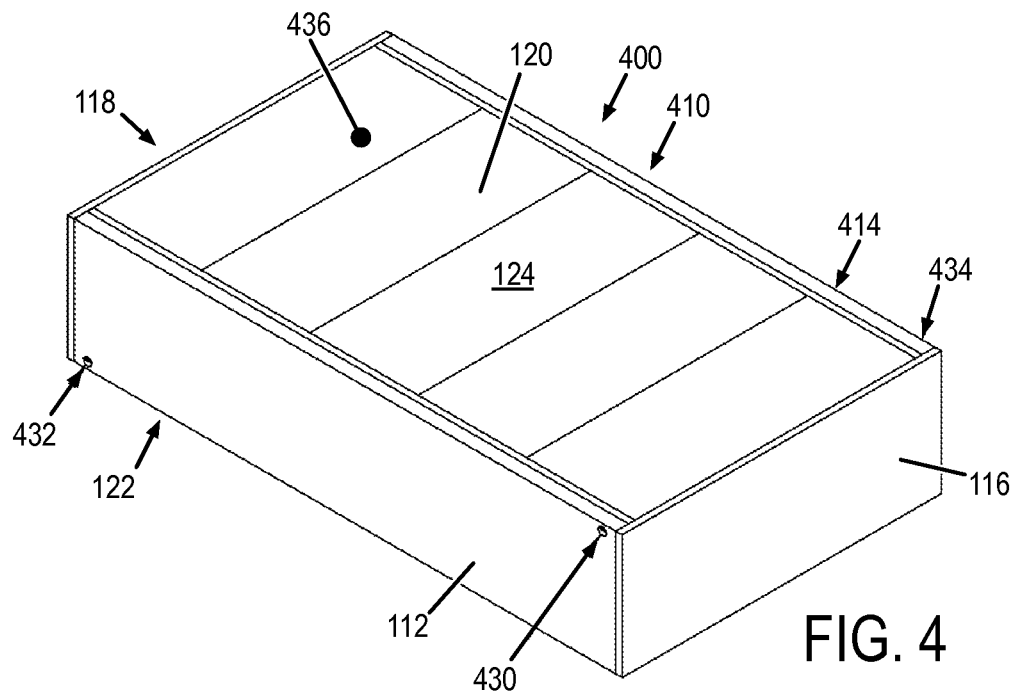
FIGS. 4-6 depict an example battery system according to a second implementation having a different fluid pathway configuration as compared to the first implementation.
Figure 5:
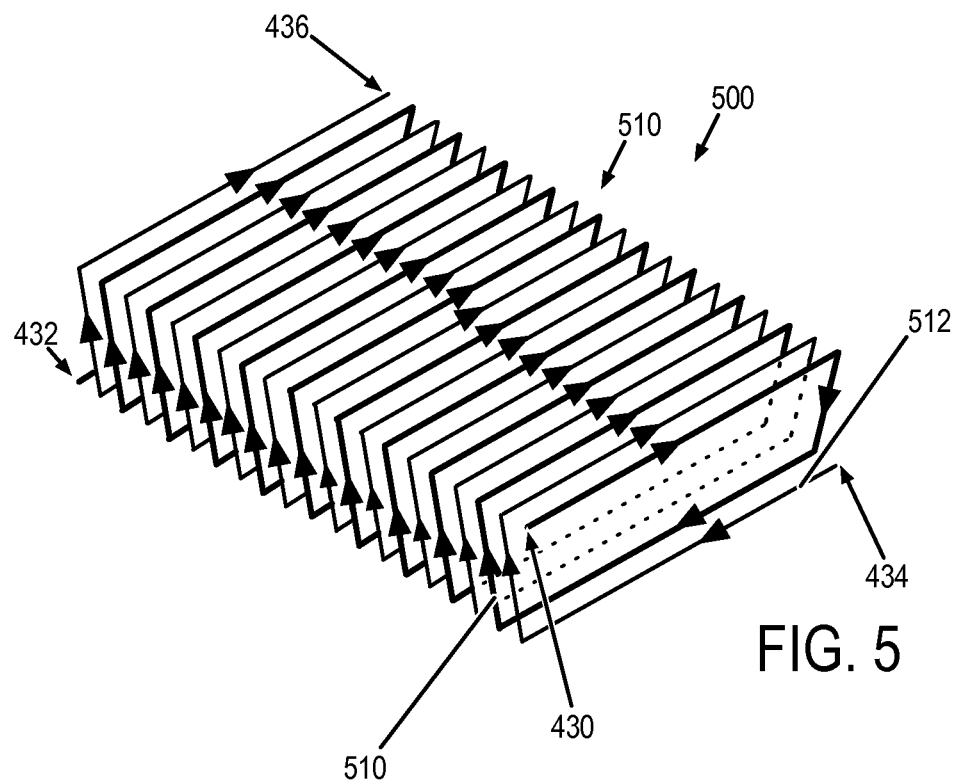
Figure 6:
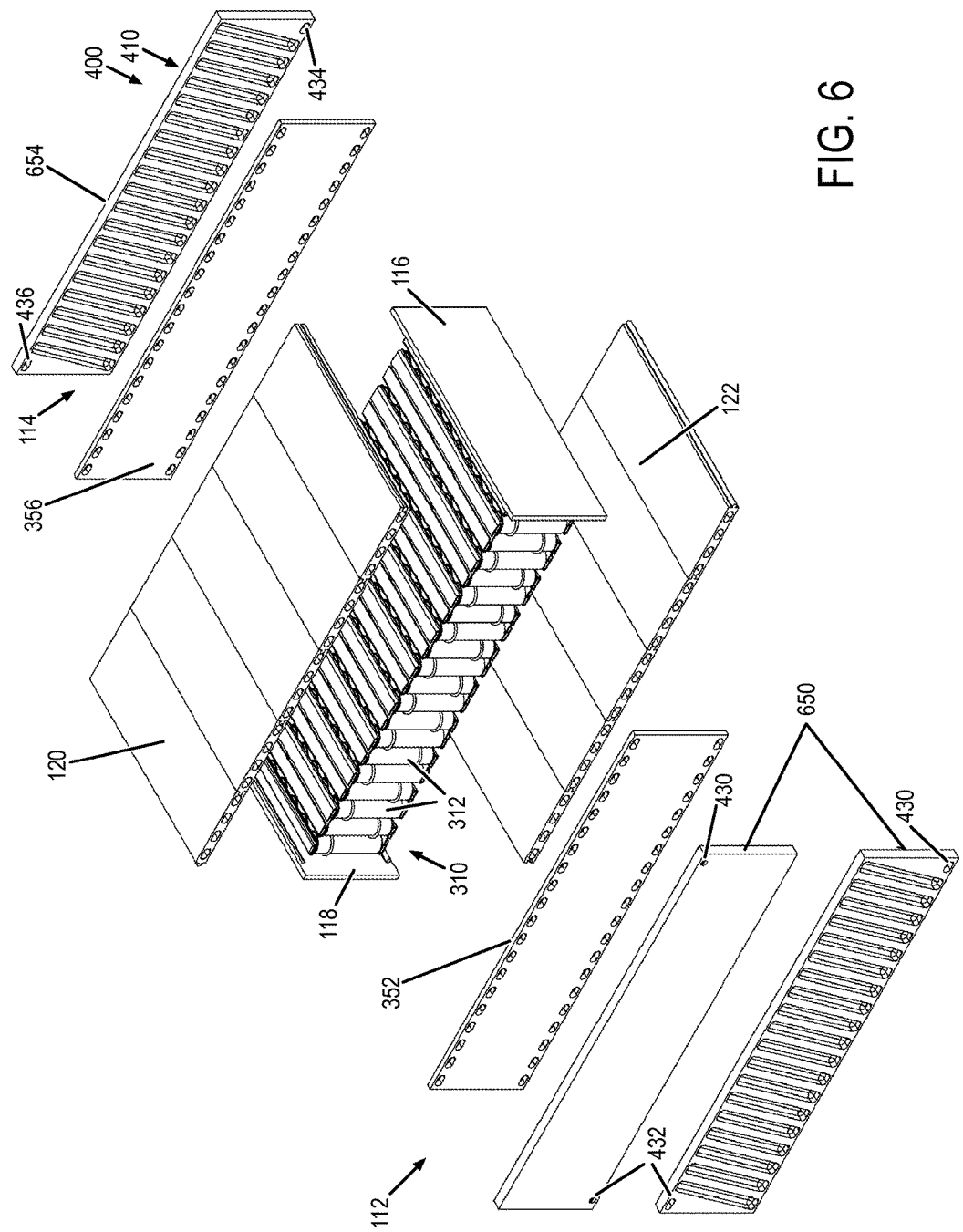

FIGS. 4-6 depict an example battery system 400 according to a second implementation having a different fluid pathway configuration as compared to the first implementation of FIGS. 1-3. Battery system 400 includes a battery enclosure 410. Battery enclosure 410 is similar to previously described battery enclosure 110 of FIGS. 1-3 with the exception of the return plates. In this example, return plate 650 of FIG. 6 replaces return plate 350 of FIG. 3, and return plate 654 of FIG. 6 replaces return plate 356 of FIG. 3 to provide different fluid inputs and outputs.

In contrast to return plate 350 that includes two fluid inputs and two fluid outlets, return plate 350 includes a single fluid input 430 and a single fluid outlet 432. Also, in contrast to return plate 354 that includes no fluid inputs or fluid outlets, return plate 654 includes a fluid input 434 and a fluid outlet 436. In FIG. 4, fluid outlet 436 is located on a rear face of the enclosure. Furthermore, return plate 654 transfers fluid between primary fluid pathways in a different manner than return plate 354. Return plates 650 and 654 are described and depicted in further detail with reference to FIGS. 19-21. In this example, openings formed in wall 112 of FIG. 4 instead include fluid inlet 430 and fluid outlet 432 located at opposite corners of wall 112. Opposing wall 114 of FIG. 4 also has openings formed therein that include fluid inlet 434 and fluid outlet 436 located at opposite corners of wall 114.

Referring to FIG. 5, a first set of fluid pathways formed within the walls of enclosure 410 communicate with fluid inlet 430 and fluid outlet 432 to provide a first fluid circuit 510. A second set of fluid pathways formed within the walls of enclosure 410 communicate with fluid inlet 434 and fluid outlet 436 to provide a second fluid circuit 512 that is independent of first fluid circuit 510. First and second fluid circuits 510 and 512 in this example are interspersed with each other to provide thermal regulation of battery assembly 312 contained within enclosure 110. For example, first and second fluid circuits 510 and 512 provide cooling to different rows of batteries with each fluid circuit providing cooling to every other row of batteries. It will be understood that the fluid flow directions and designations of fluid input and output may be reversed to provide different flow configurations.

Figure 7:
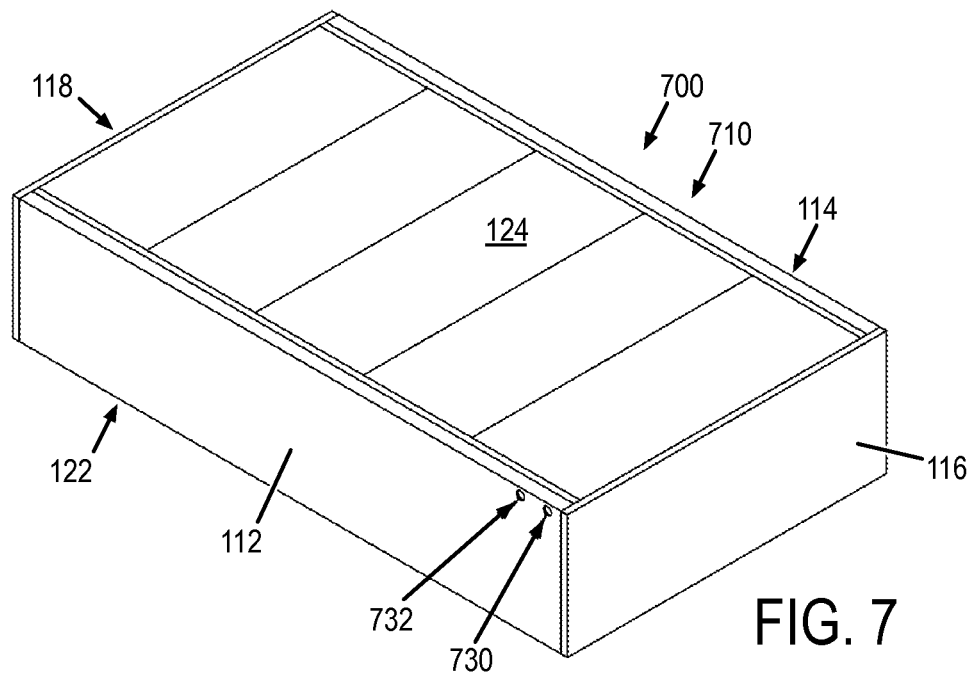
FIGS. 7-9 depict an example battery system according to a third implementation having a different fluid pathway configuration as compared to the first and second implementations.
Figure 8:
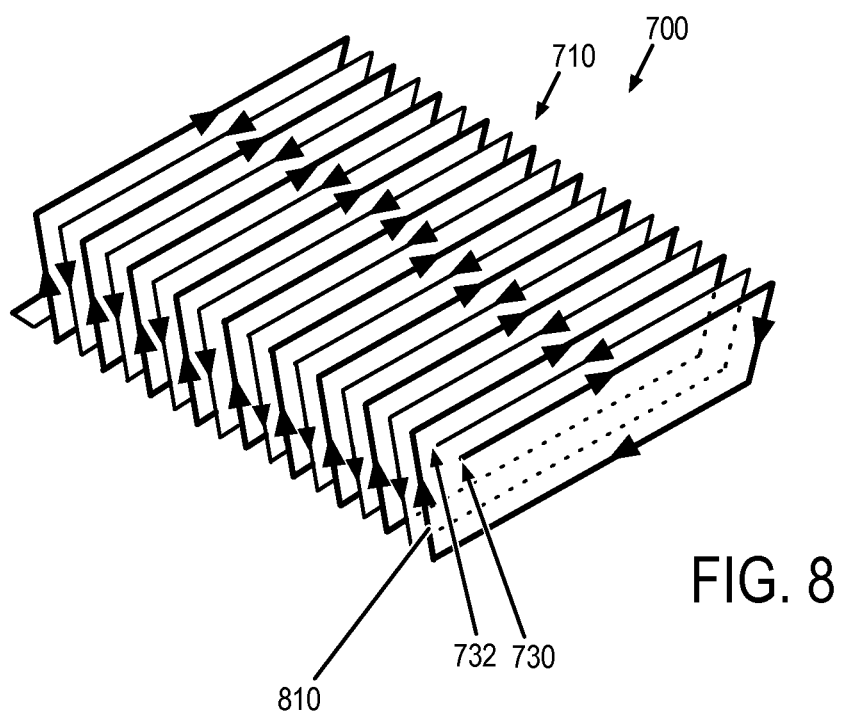
Figure 9:
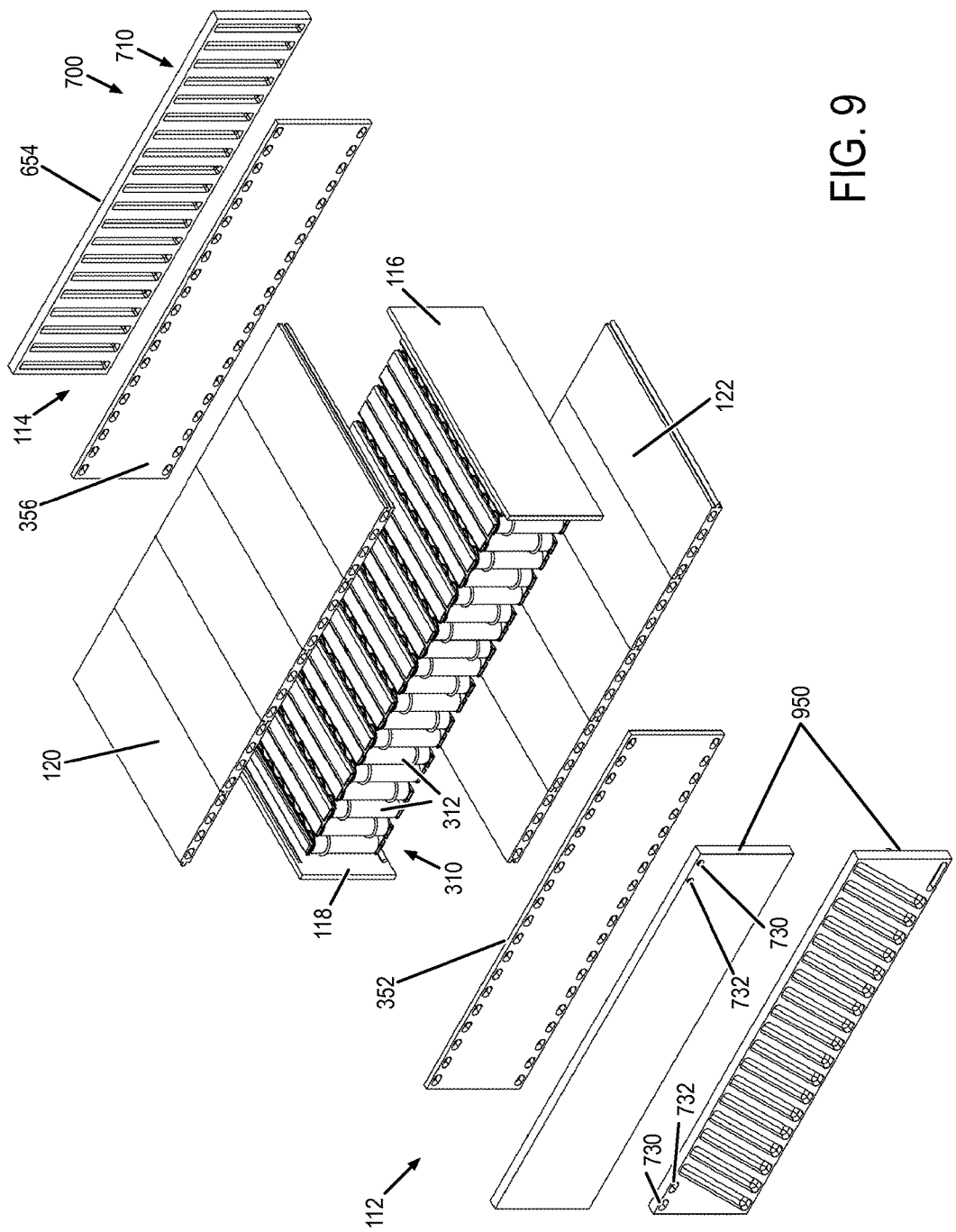

FIGS. 7-9 depict an example battery system 700 according to a third implementation having a different fluid pathway configuration as compared to the first and second implementations of FIGS. 1-6. Battery enclosure 710 is similar to previously described battery enclosure 110 of FIGS. 1-3 with the exception of return plate 350. In this example, return plate 950 of FIG. 9 replaces return plate 350 of FIG. 3 to provide different fluid inputs and outputs. In contrast to return plate 350 that includes two fluid inputs and two fluid outlets, return plate 950 includes a single fluid input 730 and a single fluid outlet 732. Return plate 950 is described and depicted in further detail with reference to FIGS. 28-30. In this example, openings formed in wall 112 of FIG. 7 instead include fluid inlet 730 and fluid outlet 732 located at the same corner of wall 112. Referring to FIG. 8, fluid pathways formed within the walls of enclosure 710 communicate with fluid inlet 730 and fluid outlet 732 to provide a single fluid circuit 810. In this example, fluid circuit 810 includes a single continuous loop that makes two passes through the enclosure, with each pass through the enclosure being interspersed with the other pass having a counter-flow direction.

Figure 10:
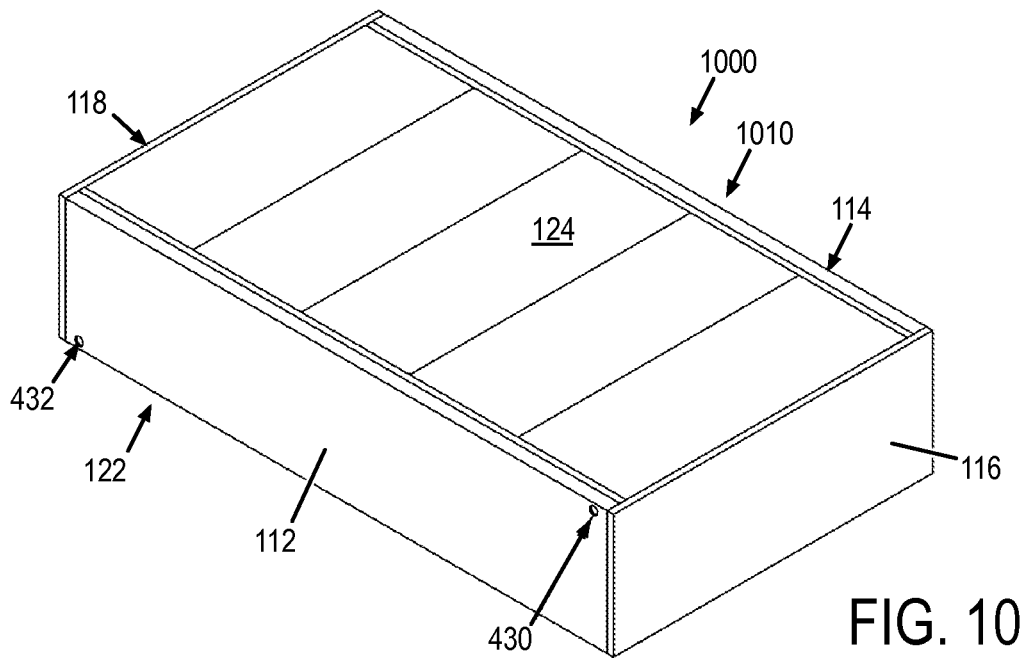
FIGS. 10-12 depict an example battery system according to a fourth implementation having a different fluid pathway configuration as compared to the first, second, and third implementations.
Figure 11:
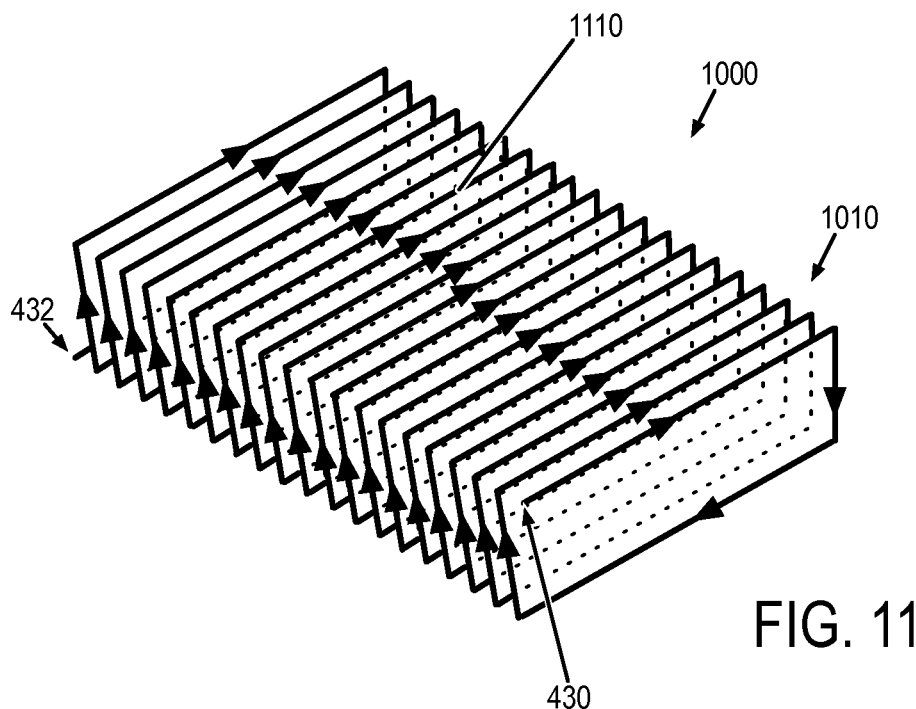
Figure 12:
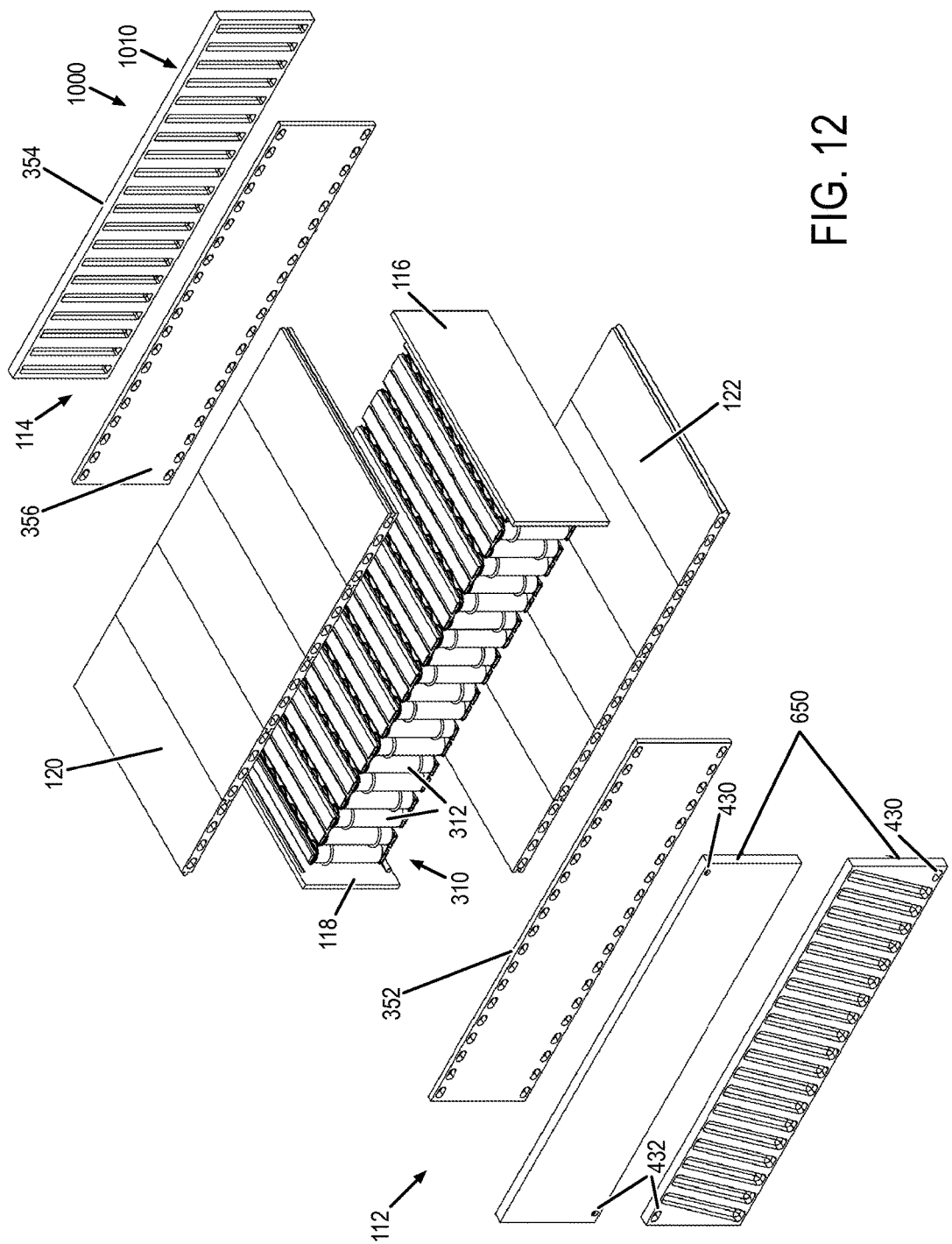

FIGS. 10-12 depict an example battery system 1000 according to a fourth implementation having a different fluid pathway configuration as compared to the first, second, and third implementations of FIGS. 1-9. Battery enclosure 1010 is similar to previously described battery enclosure 110 of FIGS. 1-3 with the exception of return plate 350. In this example, return plate 650 of FIG. 12 replaces return plate 350 of FIG. 3 to provide different fluid inputs and outputs. In contrast to return plate 350 that includes two fluid inputs and two fluid outlets, return plate 650 includes a single fluid input 430 and a single fluid outlet 432. Return plate 650 is described and depicted in further detail with reference to FIGS. 19-21. In this example, openings formed in wall 112 of FIG. 10 instead include fluid inlet 430 and fluid outlet 432 located at opposite corners of wall 112. Referring to FIG. 11, fluid pathways formed within the walls of enclosure 1010 communicate with fluid inlet 430 and fluid outlet 432 to provide a single fluid circuit 1110. In this example, fluid circuit 1010 makes a single pass through the enclosure.

FIGS. 13-15 depict example modular wall portion 124 of FIGS. 1-12 in further detail. Modular wall portion 124 includes primary fluid pathways 320 or 322 depending on whether the modular wall portion is incorporated into wall 120 or wall 122. FIG. 14 shows a view of an interior or exterior-facing surface of wall portion 124 along an axis that is orthogonal to an axis of fluid pathways 124. FIG. 15 shows a side view of wall portion 124 as viewed along the axis of fluid pathways 124. In this example, wall portion 124 includes four fluid pathways. In other examples, wall portion 124 may include one, two, three, five or more fluid pathways. Modular wall portion 124 further includes a tongue 1310 and groove 1312 along opposing edges of modular wall portion 124 that are parallel to fluid pathways 320. In some examples, the tongue and groove may be omitted. Tongue 1310 mates with groove 1312 of a different instance of modular wall portion 124 to provide an enclosure wall of any suitable size. Tongue 1310 may alternatively mate with a corresponding groove formed in an interior face of wall 116. In the examples depicted in FIGS. 1-12, wall 116 includes two parallel grooves for tongues associated with walls 120 and 122. Groove 1312 may alternatively mate with a corresponding tongue that projects from an interior face of wall 118. In the examples depicted in FIGS. 1-12, wall 118 includes two parallel tongues for grooves associated with walls 120 and 122. It will be understood that modular wall portion 124 provides an example modular component for walls 120 and 122, and that other suitable configurations may be used.

FIGS. 16-18 depict example baffle plates 352 or 356 in further detail. FIG. 17 shows a view of an interior or exterior face of a baffle plate along an axis that is parallel to an axis of fluid openings 353 or 357. FIG. 18 shows a side view of the baffle plate along an axis that is orthogonal to the view shown in FIG. 17. The baffle plate includes a plurality of openings formed therein labeled sequentially as I.1-I.40. The openings pass entirely through the baffle plate from an interior face to an exterior face of the baffle plate. A first set of openings I.1-I.20 are evenly distributed along a first edge of the baffle plate. Openings I.1-I.20 have the same spacing and size as primary fluid channels P.1-P.20, and join primary fluid channels P.1-P.20. A second set of openings I.21-I.40 are evenly distributed along a second edge of the baffle plate. Fluid channels I.21-I.40 have the same spacing and size as primary fluid channels P.21-P.40, and join primary fluid channels P.21-P.40.

In the examples depicted herein, an interior face of each return plate includes fluid channels that are covered by a flat face of a baffle plate that interfaces with the interior face of the return plate to form return pathways. In another example, the interior face of the return plates may include a flat face and the baffle plates may include fluid channels formed in an exterior face. In still another example, the interior face of the return plate and the exterior face of the baffle plate may each include fluid channels that, in combination with each other, form the return fluid pathways.

FIGS. 19-21 depict example return plate 650 or 654 in further detail. Return plates 650 and 654 each include nineteen fluid channels 1960 formed within an interior face that form part of return fluid pathways R.1-R.19. FIG. 20 depicts a view of an interior face of return plate 650 and 654. FIG. 21 depicts a side view of return plate 650 and 654 that is orthogonal to the view depicted by FIG. 20. Fluid channels 1960 do not pass entirely through return plate 650 and 654 from the interior face to the exterior face. In this example, fluid channels 1960 are angled relative to exterior edges of return plate 650 and 654 to transfer fluid between non-aligned primary fluid channels—e.g., of different battery rows. As examples, fluid pathway R.1.A of return plate 650 transfers fluid between openings I.1.A and I.22.A of baffle plate 352, and fluid pathway R.19.A transfers fluid between openings I.19.A and I.40.A of baffle plate 352. Return plate 650 and 654 also includes openings corresponding to fluid inlets and outlets 430, 432, 434, and 436 that pass entirely through the return plate from the interior face to the exterior face.

FIGS. 22-24 depict example return plate 354 in further detail. Return plate 354 includes fluid channels 362 formed within an interior face that form part of return fluid pathways labeled sequentially as R.1.B-R.20.B. FIG. 23 depicts a view of an interior face of return plate 354. FIG. 24 depicts a side view of return plate 354 that is orthogonal to the view depicted by FIG. 23. Fluid channels 362 do not pass entirely through return plate 354 from the interior face to the exterior face. In this example, fluid channels 362 are parallel to exterior edges of return plate 354 to transfer fluid between aligned primary fluid channels of opposing walls 120 and 122—e.g., of the same battery row. As examples, fluid pathway R.1.B transfers fluid between openings I.1.B and I.21.B of baffle plate 356, and fluid pathway R.20.B transfers fluid between openings I.20.B and I.40.B of baffle plate 356.

FIGS. 25-27 depict example return plate 350 in further detail. FIG. 26 depicts a view of return plate 350 along an axis that is parallel to an axis of the openings corresponding to fluid inlets and outlets 130, 132, 134, and 136. FIG. 27 depicts a side view of return plate 350 that is orthogonal to the view depicted in FIG. 26. Return plate 350 includes fluid channels 360 formed within an interior face. Fluid channels 360 do not pass entirely through return plate 350 from the interior face to the exterior face. In this example, fluid channels 360 are angled relative to exterior edges of return plate 350 to transfer fluid between non-aligned primary fluid channels of opposing walls 120 and 122—e.g. of a different battery row. As examples, fluid pathway R.1.A transfers fluid between openings I.1.A and I.22.A of baffle plate 352, fluid pathway R.9.A transfers fluid between openings I.9.A and I.30.A of baffle plate 352, fluid pathway R.11.A transfers fluid between openings I.11.A and I.32.A of baffle plate 352, and fluid pathway R.19.A transfers fluid between openings I.19.A and I.40.A of baffle plate 352. Openings corresponding to fluid inlets and outlets 130, 132, 134, and 136 pass entirely through return plate 350 from the interior face to the exterior face. Fluid inlet 130 joins opening I.10.A of baffle plate 352. Fluid inlet 134 joins opening I.31.A of baffle plate 352. Fluid outlets 132 and 136 are located at opposite corners of return plate 350. Fluid outlet 132 joins opening I.21.A of baffle plate 352. Fluid outlet 136 joins opening I.20.A of baffle plate 352.

FIGS. 28-30 depict example return plate 950 in further detail. Return plate 950 includes eighteen fluid channels 2860 formed within an interior face that form part of return fluid pathways labeled sequentially as R.1.A-R.18.A. FIG. 29 depicts a view of an interior face of return plate 950. FIG. 30 depicts a side view of return plate 950 that is orthogonal to the view depicted by FIG. 29. Fluid channels 2860 do not pass entirely through return plate 950 from the interior face to the exterior face. In this example, fluid channels 2860 are angled relative to exterior edges of return plate 950 to transfer fluid between non-aligned and non-neighboring primary fluid channels of opposing walls 120 and 122—e.g., different battery rows. In this example, the non-aligned and non-neighboring primary fluid channels are spaced apart from each other by an intermediate primary fluid pathway and an intermediate battery row. As examples, fluid pathway R.1.A transfers fluid between openings I.1.A and I.23.A of baffle plate 352, and fluid pathway R.18.A transfers fluid between openings I.18.A and I.40.A of baffle plate 352. Openings corresponding to fluid inlet 730 and fluid outlet 732 pass entirely through return plate 950 from the interior face to the exterior face. Fluid inlet 730 joins opening I.20.A of baffle plate 352. Fluid outlet 732 joins opening I.19.A of baffle plate 352. Also in this example, baffle plate 950 further includes an intra-plate fluid channel 2864 that joins openings I.21.A and I.22.A of baffle plate 352.

The various battery systems disclosed herein enclose and regulate temperature of a plurality of battery cells. The temperature regulation of battery cells is a particular problem in a variety of energy storage applications, including motive batteries for electric vehicles and battery backup for electronics. Energy dense cells such as lithium-ion batteries may have a high internal resistance and therefore generate heat when charging and discharging. When many such cells are collected into a single pack, differences in the temperature of cells may cause premature aging of cells exposed to more heat, which can reduce the useful life of the pack as a whole. Further, such cells may heat beyond a safe threshold and experience thermal runaway, which can cascade between adjacent cells and cause fire and risk of damage to equipment or injury. A number of conventional systems for regulating temperature of battery cells have been proposed, but such systems are often costly to produce and add complexity and weight to the overall energy storage system.

The various examples of a battery system disclosed herein provide an enclosure structure for energy storage cells that integrates temperature regulation functionality within the structural elements such that the complexity and cost of manufacture of the energy storage system can be reduced. By forming the largest faces of the enclosure structure from extruded profiles and including passages for the flow of temperature regulation media (e.g., a fluid such as a gas or liquid) as a feature of those extruded profiles, production costs can be kept low. For example, there may no longer be a need for a separate temperature regulation system in addition to the disclosed battery system due to the integrated fluid pathways of the battery enclosure. Additionally, sources of leakage of a cooling fluid may be reduced by reducing the number of joints between joined portions of the fluid pathways and other openings associated with baffle plates or return plates.

As described with reference to FIGS. 1-30, the battery enclosure is formed from two or more walls positioned in parallel planes. Each wall may be constructed from one or more extruded profiles. Wall portions, such as wall portion 124, may be mechanically joined to each other or other walls of the enclosure by such processes as friction stir welding, adhesive bonding, mechanical fasteners, etc. or they may be coupled by interlocking features on the extrusion profile such as a tongue and groove, as non-limiting examples.

Each extrusion profile disclosed herein contains one or more enclosed fluid pathways for the flow of temperature regulation media. In one example, enclosure walls may be formed from multiple instances of a modular wall component that has a single extrusion profile. In another example, different extrusion profiles may be used on one wall or on an individual modular wall portion than on an opposing wall or neighboring modular wall portion in order to add additional structural elements. An example of these additional structural elements include an impact buffer for a battery pack positioned along the bottom plane of an electric vehicle body. The enclosure walls disclosed herein may contain additional channels for passive cooling, including channels located on an exterior of the battery enclosure.

The battery enclosure disclosed herein has a header located on one or more sides of the battery enclosure to direct the flow of the temperature regulation media between two opposing walls—e.g., walls 120 and 122. The header may be constructed of a baffle plate element and a return plate element. Such elements may be constructed from milled aluminum or other suitable material, and joined via adhesive bonding, welding, mechanical fasteners, or may be 3D printed or cast as single pieces, as non-limiting examples. The four different implementations described in FIGS. 1-12 show that by changing only the header elements or other return elements, a multiplicity of flow configurations can be established without changing the construction of the intermediate wall portions—e.g., walls 120 and 122 that include primary fluid pathways. In the examples depicted and described herein, the fluid circuits may be constructed to place adjacent flows equidistant from inlet and outlet so as to provide as nearly practicable a constant temperature across walls 120 and 122.

In at least some examples, a gasket layer may be interposed between the various components to provide increased sealing and prevent leakage. For example, a gasket layer may be disposed between return plates and baffle plates, between baffle plates and walls 112, 114, 116, 118, 120, and 122. The gasket layer may include openings that correspond to the various fluid pathways. The header elements may further serve as two additional faces or walls of the overall battery enclosure. For example, each header element may contain structural reinforcement in addition to channels for directing the temperature regulating media. The header elements may contain through-holes that allow for passage of electrically conductive wiring or terminals, or for the escape of vented gases should a battery experience a critical failure.

The energy storage elements are positioned between two parallel or otherwise opposing plates or wall portions such that a thermal pathway is established between each battery and the parallel or otherwise opposing plates or wall portions. In one example, there may be a thermally conductive, electrically resistive planar interface layer positioned between electrically conductive elements of the battery assembly and the wall surfaces. In at least some examples, the batteries are lithium-ion battery cells coupled to electrically and thermally conductive tabs or strips. Walls 120 and 122 that include the primary fluid pathways may be sized and/or mechanically tensioned (e.g., via fasteners or other suitable mechanical approach) towards one another such that the plates exert a compressive force on the ends of the batteries in order to provide strong thermal conductivity between the batteries and the these walls.

Another battery enclosure is disclosed herein with reference to FIGS. 31-38 that is formed by a pair of opposing enclosure portions that collectively define a battery region. These enclosure portions may take the form of modular wall portions that are be identical to each other, and may be formed by the same or similar extrusion die or process. The identical and/or modular nature of these enclosure portions may enable cost reduction in terms of extrusion die tooling, and ease of assembly in terms of the commonality of enclosure components.

Figure 31:
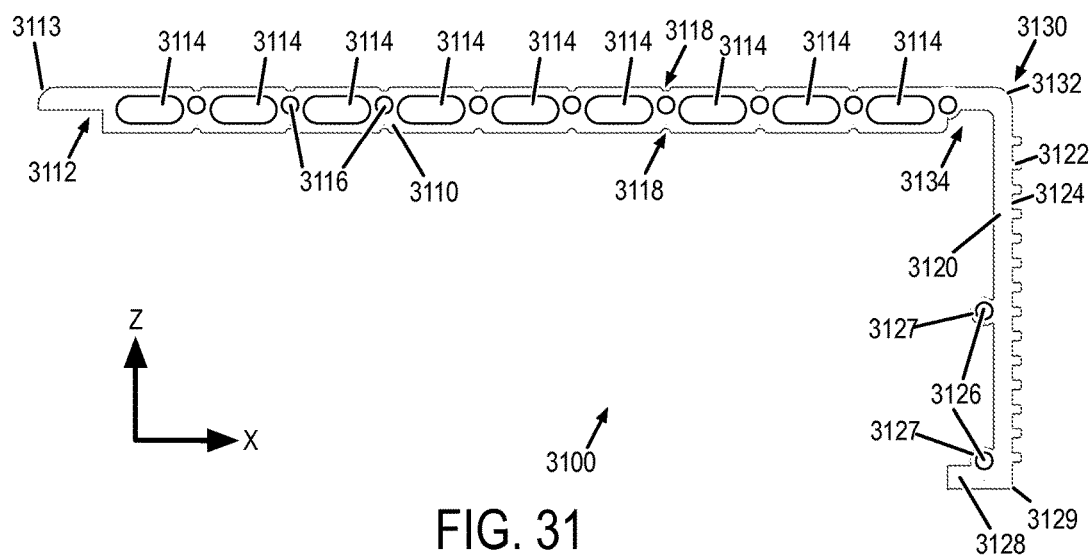
FIG. 31 depicts a section view of an example enclosure portion.
Figure 32:
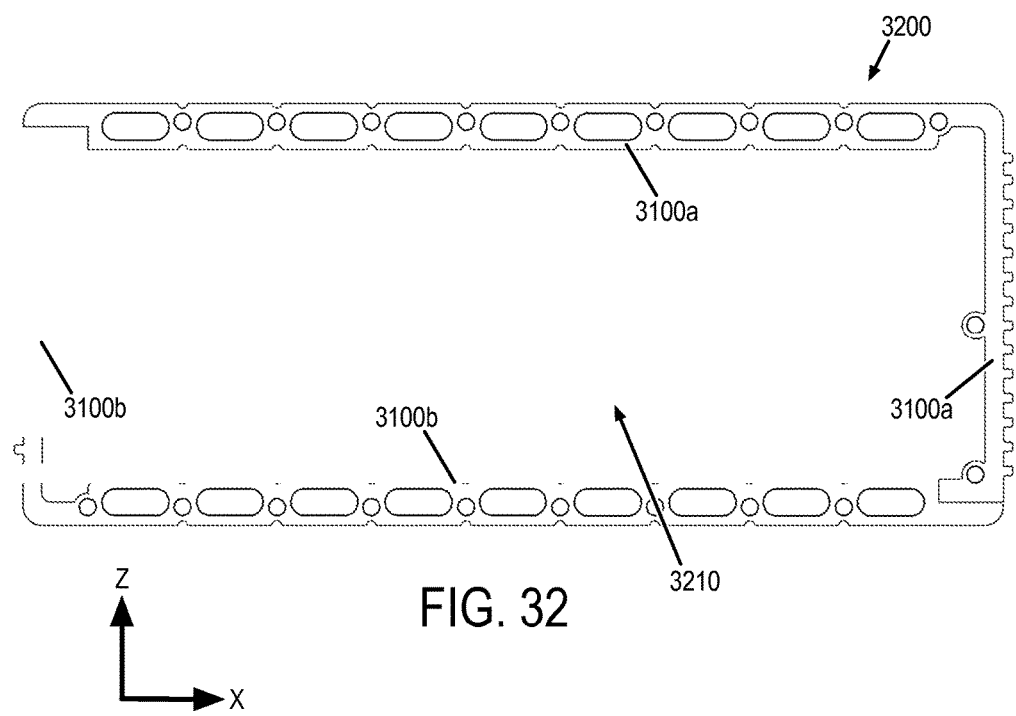
FIG. 32 depicts a section view of an example battery enclosure.
Figure 33:
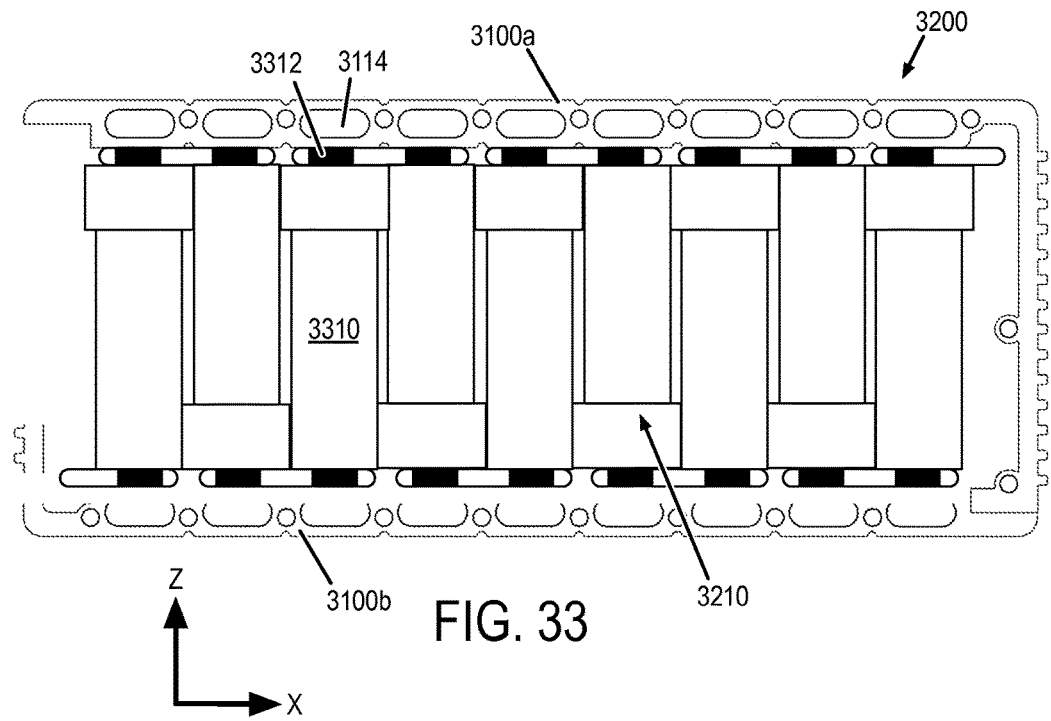
FIG. 33 depicts an example battery configuration within a battery region of the example battery enclosure of FIG. 32.
Figure 34:
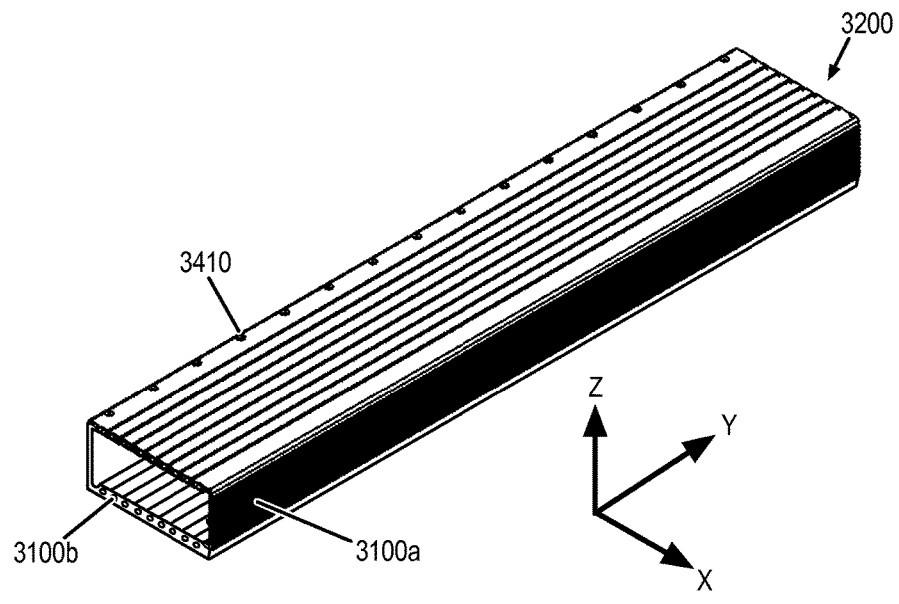
FIGS. 34-35 depict additional views of the example battery enclosure of FIG. 32 from different perspectives.
Figure 35:
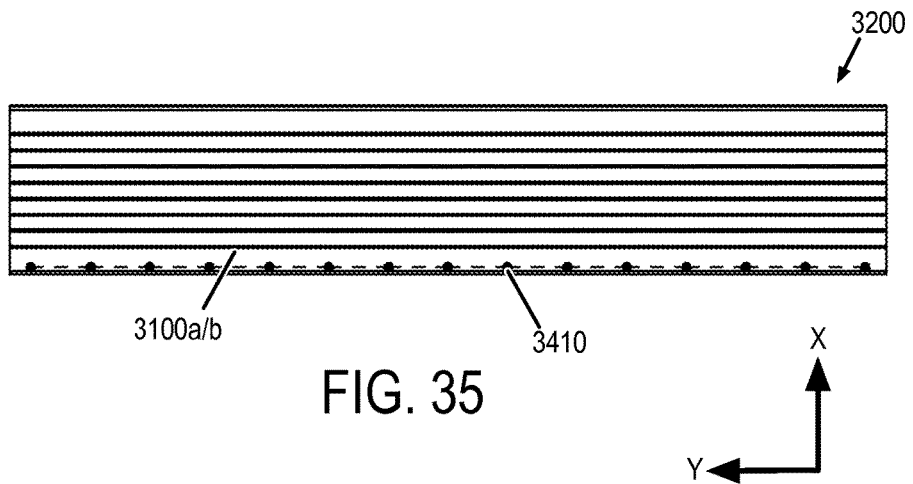

FIG. 31 depicts a section view of an example enclosure portion 3100. Enclosure portion 3100 generally forms an L-shape when viewed in section. Enclosure portion 3100 may be combined with another copy or instance of itself to form a battery enclosure. For example, FIG. 32 depicts a section view of an example battery enclosure 3200 formed by combining enclosure portion 3100 of FIG. 31 with another copy of itself, as indicated by reference numerals 3100a and 3100b. Enclosure portions 3100a and 3100b collectively define a battery region 3210. FIG. 33 depicts an example battery configuration within battery region 3210 of battery enclosure 3200. FIGS. 34 and 35 provide additional views of battery enclosure 3200 from different perspectives.

Enclosure portions 3100a and 3100b may replace walls 116, 118, 120, and 122 of the previously described battery systems of FIGS. 1-30. It will be understood that enclosure portions 3100a and 3100b may each include any suitable quantity of fluid pathways identified by reference numeral 3114, including twenty fluid pathways as depicted in the examples of FIGS. 1-30. For example, enclosure portions 3100a and 3100b may interface with the various baffle plates and return plates described herein, and may be sized to hold battery assembly 312.

Referring again to FIG. 31, enclosure portion 3100 includes a first segment 3110 and a second segment 3120 that join each other at an interface 3130. In this example, first segment 3110 is longer than second segment 3120, and second segment 3120 is orthogonal to first segment 3110. In other examples, first segment 3110 may be shorter than second segment 3120, or first segment 3110 and second segment 3120 may have the same or similar length. In yet other examples, second segment 3120 may be angled relative to first segment 3110 to form either an acute angle or an obtuse angle between segments 3110 and 3120.

First segment 3110 defines a plurality of internal fluid pathways 3114. Fluid pathways 3114 may be used to transport a fluid in gas and/or liquid forms. This fluid may include a coolant or other suitable working fluid that assists in the removal of heat from the battery region of the battery enclosure. In this example, first segment 3110 includes nine fluid pathways that are spaced apart from each other at regular intervals. In another example, first segment 3110 may include at least one fluid pathway but fewer than nine fluid pathways. In another example, first segment 3110 may include ten or more fluid pathways. In yet another example, first segment 3110 does not include any fluid pathways.

First segment 3110 may further include surface structure, such as channels 3118 formed within interior and exterior surfaces of the first segment. In this example, channels 3118 are located between fluid pathways 3114. Channels 3118 may increase heat exchange between the battery enclosure and the surrounding environment. In other examples, channels 3118 may be omitted. Second segment 3120 includes a plurality of heat exchanging fins 3122 that protrude outward from an exterior surface 3124 of the second segment. Fins 3122 may increase heat exchange between the battery enclosure and the surrounding environment. In other examples, second segment 3120 may not include heat exchanging fins.

Second segment 3120 includes a flange 3128 formed at a distal end from interface 3130. First segment 3110 includes a corresponding notched region 3112 formed at a distal end from interface 3130 that accommodates flange 3128 of another copy of enclosure portion 3100, such as depicted in FIG. 32, for example. In this example, notched region 3112 is formed on an interior surface of first segment 3110. An exterior surface of first segment 3110 at the distal end may include a radius 3113. Radius 3113 may be the same as or similar to radius 3132 on an exterior surface of interface 3130. Radii 3113, 3132 may be omitted in other examples. Exterior surfaces of flange 3128 include corners 3129 that do not include a radius. In other examples, one or more of these corners may include a radius.

Some or all of the features of enclosure portion 3100 depicted in the section views of FIGS. 31 and 32 extend along the entire length of the enclosure portion as measured along the Y-coordinate axis. For example, fluid pathways 3114 extend through first segment 3110 along the entire length of enclosure portion 3100 as measured along the Y-coordinate axis. In this example, the fluid pathways 3114 are parallel to the Y-coordinate axis. As another example, flange 3128, notched region 3112, and fins 3122 extend along the entire length of the enclosure portion as measured along the Y-coordinate axis.

In at least some examples, enclosure portion 3100 may be produced by extruding a material along the Y-coordinate axis and parallel to the fluid pathways. Identical enclosure portions 3100a and 3100b may be produced using the same or similar extrusion die. However, other suitable manufacturing techniques may be used. Non-limiting examples of materials suitable for extrusion include metals (e.g., steel, aluminum, etc.), polymers, and ceramics. FIGS. 34 and 35 provide additional views of an exterior of battery enclosure 3200, which includes features that extend along the entire length of enclosure portions 3100a and 3100b. Enclosure portions 3100a and 3100b may have the same length as each other as measured in the Y-coordinate axis to provide a battery enclosure with uniform end surfaces that are orthogonal to the Y-coordinate axis.

Enclosure portion 3100 may further include additional openings that accommodate corresponding fasteners for securing one or more additional components to the enclosure. For example, first segment 3110 may further define one or more additional openings 3116, and second segment 3120 may further define one or more additional openings 3126. Openings 3116, 3126 may take the form of threaded holes that each accommodate a threaded bolt or screw. In at least some examples, openings 3116, 3126 may have a depth (as measured along the Y-coordinate axis) within enclosure portion 3110 that does not extend along the entire length of the enclosure portion. In this example, openings 3116, 3126 may formed by boring and tapping techniques after the enclosure portion is produced by an extrusion process. Also in this example, openings 3126 are formed within regions of increased wall thickness of the second segment indicated at 3127. These regions of increased wall thickness may be used in examples where second segment 3120 has an overall thinner wall thickness than first segment 3110. In other examples, second segment 3120 may have the same wall thickness or a greater wall thickness than first segment 3110.

FIGS. 34 and 35 depict additional locations where threaded holes and corresponding threaded fasteners may be used to secure enclosure portions 3100a and 3100b in an opposing configuration. As an example, battery enclosure 3200 may include a plurality of openings indicated at 3410 that are spaced apart from each other along the Y-coordinate axis. In this example, an opening passes through first segment 3110 at notched region 3112, and a corresponding opening is formed in flange 3128 of second segment 3120. The opening formed in flange 3128 of second segment 3120 may take the form of a tapped hole. A threaded fastener may be inserted through the opening that passes through first segment 3110 at notched region 3112 and threaded into the opening formed in flange 3128 to secure enclosure portions 3100a and 3100b.

In the assembled configuration depicted in FIG. 32, enclosure portions 3100a, 3110b each include fluid pathways that are aligned with opposing fluid pathways of the other enclosure portion. FIG. 33 additionally depicts how individual battery cells 3310 and their respective electrical contacts and/or packing components (indicated at 3312) may be aligned with the fluid pathways, with each battery cell having a corresponding upper and lower fluid pathway. Enclosure portions 3100a and 3100b may be sized to accommodate example battery assembly 310 of FIG. 3, for example. In other examples, fluid pathways of a first enclosure portion may be offset from fluid pathways of a second enclosure portion in the X-coordinate axis. Terminating ends of the fluid pathways may be joined with fluid pathways of other fluid routing components, including fluid manifolds and/or fluid routing devices. In an example, a fluid routing device located at a terminating end of the battery enclosure may route fluid from some or all of the fluid pathways of a first enclosure portion to some or all of the fluid pathways of a second enclosure portion of the battery enclosure. For example, any of the baffle plates and return plates of FIGS. 1-30 may be used to form walls 112 and 114 of an enclosure in combination with enclosure portions 3100a and 3100b.

Figure 36:
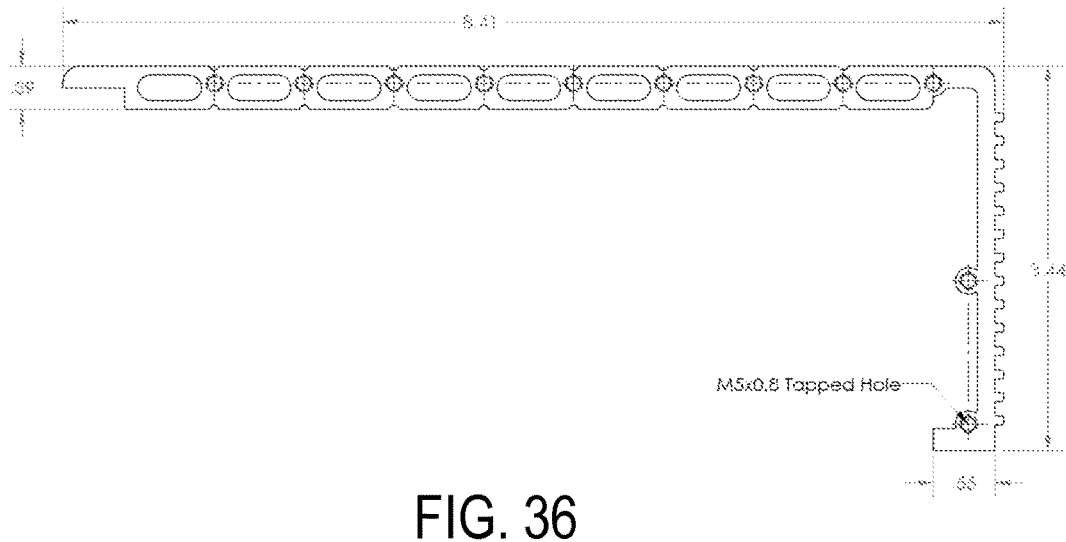
FIG. 36 depicts a section view of the example enclosure portion of FIG. 32 with example dimensions in inches.

FIG. 36 depicts a section view of the example enclosure portion 3100 of FIG. 31 with example dimensions in inches. It will be appreciated that the example dimensions depicted in FIG. 36 are non-limiting, and that enclosure portions of other suitable sizes and shapes may be used depending on implementation.

Figure 37:
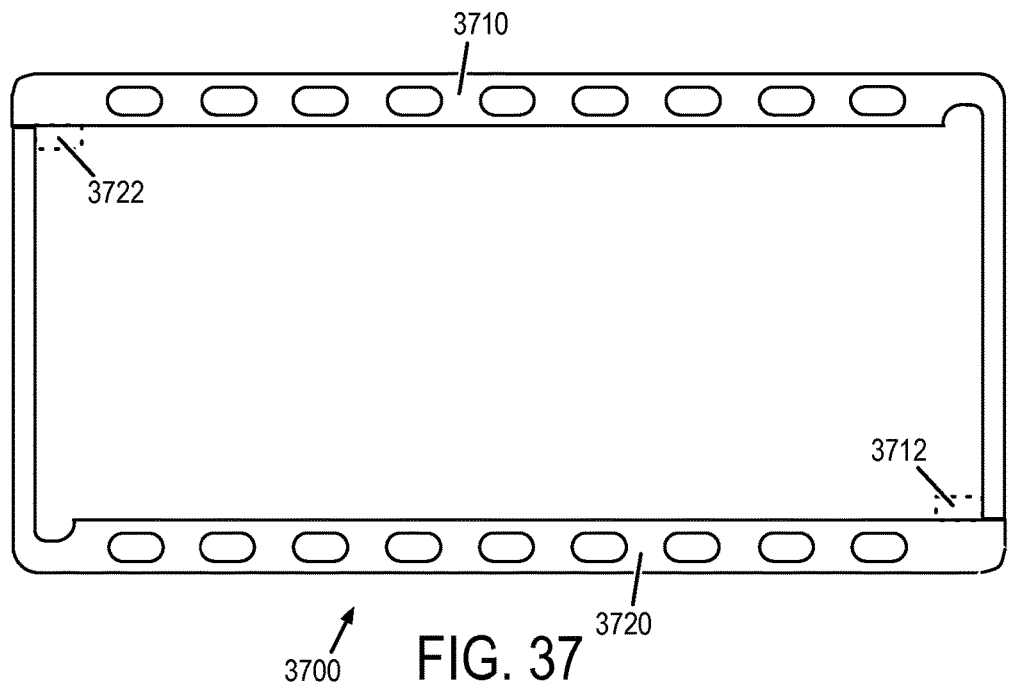
FIG. 37 depicts a section view of another example battery enclosure formed by a pair of enclosure portions.

FIG. 37 depicts a section view of another example battery enclosure 3700 formed by a pair of enclosure portions 3710, 3720. In this example, notched regions (e.g., previously described notched region 3112 of FIG. 31) of the segments containing the fluid pathways are omitted. Also in this example, flanges 3712, 3722 (e.g., previously described flange 3128 of FIG. 31) may be optionally included or omitted from the enclosure portions.

Figure 38:
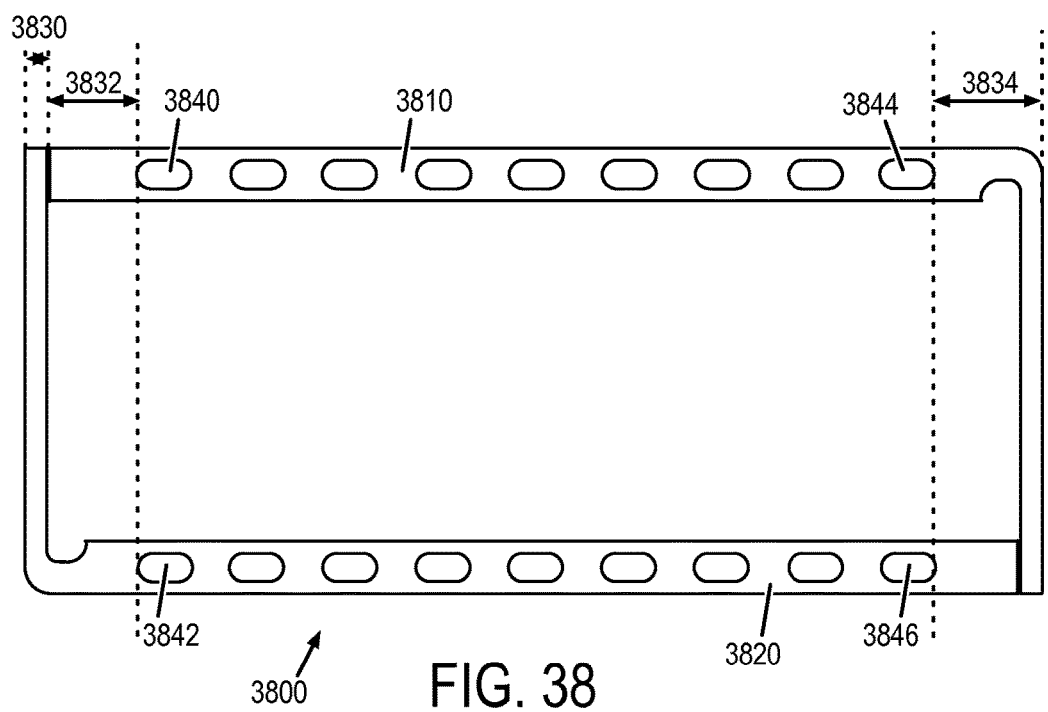
FIG. 38 depicts a section view of yet another example battery enclosure formed by a pair of enclosure portions.

FIG. 38 depicts a section view of yet another example battery enclosure 3800 formed by a pair of enclosure portions 3810, 3820. In this example, notched regions and flanges are omitted from the enclosure portions. Additionally, the segments of the enclosure portions that include the fluid pathways abut or otherwise join the side of the other segments. FIG. 38 further depicts an aligned configuration in which opposing fluid pathways are aligned with each other, including fluid pathway 3840 aligned with fluid pathway 3842, and fluid pathway 3844 aligned with fluid pathway 3846. In aligned configurations, dimension 3834 is equal to the sum of dimensions 3830 and 3832. In still further examples, enclosure portions may join each other on an angle.

It will be understood that the configurations and/or techniques described herein are exemplary in nature. Specific examples are not to be considered in a limiting sense, because numerous variations are possible. The subject matter of the present disclosure includes all novel and nonobvious combinations and subcombinations of the various configurations and techniques disclosed herein, as well as any and all equivalents thereof.

The invention claimed is:

1. A battery enclosure, comprising:
a pair of opposing enclosure portions that collectively define a battery region, each enclosure portion including:
a first segment that includes a plurality of fluid pathways spaced apart from each other, the first segment forming a notched region at a distal end of the first segment;
a second segment that joins the first segment at an interface opposite a distal end of the first segment, the second segment being orthogonal to the first segment, the second segment forming a flange at a distal end of the second segment opposite the interface;
a first wall interfacing with a first edge of the pair of opposing enclosure portions to further collectively define the battery region, an inner face of the first wall including a first set of a plurality of openings that are aligned with at least some of the plurality of fluid pathways of a first enclosure portion of the pair of enclosure portions along the first edge, the first wall including a second set of a plurality of openings that are aligned with at least some of the plurality of fluid pathways of a second enclosure portion of the pair of enclosure portions along the first edge, at least some of the first set of the plurality of openings and at least some of the second set of the plurality of openings joining each other within the first wall via fluid pathways formed therein; and
a second wall interfacing with a second edge of the pair of opposing enclosure portions opposite the first edge to further collectively define the battery region, an inner face of the second wall including a third set of a plurality of openings that are aligned with at least some of the plurality of fluid pathways of the first enclosure portion of the pair of enclosure portions along the second edge, the second wall including a fourth set of a plurality of openings that are aligned with at least some of the plurality of fluid pathways of the second enclosure portion of the pair of enclosure portions along the second edge, at least some of the third set of the plurality of openings and at least some of the fourth set of the plurality of openings joining each other within the second wall via fluid pathways formed therein;
wherein each notched region of each enclosure portion accommodates the flange of the other enclosure portion.

2. The battery enclosure of claim 1, wherein each enclosure portion is produced by extruding a material in a direction that is parallel to an axis of the fluid pathways.

3. A battery enclosure, comprising:
a pair of opposing L-shaped enclosure portions that collectively define a battery region, each enclosure portion including:
a first segment that includes a plurality of fluid pathways spaced apart from each other, and a second segment that is orthogonal to the first segment;

a first wall interfacing with a first edge of the pair of opposing L-shaped enclosure portions to further collectively define the battery region, an inner face of the first wall including a first set of a plurality of openings that are aligned with at least some of the plurality of fluid pathways of a first L-shaped enclosure portion of the pair of L-shaped enclosure portions along the first edge, the first wall including a second set of a plurality of openings that are aligned with at least some of the plurality of fluid pathways of a second L-shaped enclosure portion of the pair of L-shaped enclosure portions along the first edge, at least some of the first set of the plurality of openings and at least some of the second set of the plurality of openings joining each other within the first wall via fluid pathways formed therein; and a second wall interfacing with a second edge of the pair of opposing L-shaped enclosure portions opposite the first edge to further collectively define the battery region, an inner face of the second wall including a third set of a plurality of openings that are aligned with at least some of the plurality of fluid pathways of the first L-shaped enclosure portion of the pair of L-shaped enclosure portions along the second edge, the second wall including a fourth set of a plurality of openings that are aligned with at least some of the plurality of fluid pathways of the second L-shaped enclosure portion of the pair of L-shaped enclosure portions along the second edge, at least some of the third set of the plurality of openings and at least some of the fourth set of the plurality of openings joining each other within the second wall via fluid pathways formed therein;

wherein a distal end of the second segment of each L-shaped enclosure portion abuts or joins a distal end of the first segment of each other enclosure portion.

4. The battery enclosure of claim 3, wherein each L-shaped enclosure portion is produced by extruding a material in a direction that is parallel to an axis of the fluid pathways.

5. The battery enclosure of claim 1, wherein the first segment of each pair of opposing enclosure portions is longer than the second segment of each pair of opposing enclosure portions.

6. The battery enclosure of claim 1, wherein each of the plurality of fluid pathways of the first segment of each pair of opposing enclosure portions is aligned with an opposing fluid pathway of an opposing enclosure portion of the pair of opposing enclosure portions.

7. The battery enclosure of claim 1, wherein each of the plurality of fluid pathways of the first segment of each pair of opposing enclosure portions are spaced apart from each other at regular intervals along a length of the first segment between the distal end of the first segment and the interface.

8. The battery enclosure of claim 1, wherein the second segment of each pair of opposing enclosure portions includes a plurality of heat exchanging fins that protrude outward from an exterior surface of the second segment.

9. The battery enclosure of claim 1, wherein each of the plurality of fluid pathways of the first segment of each pair of opposing enclosure portions includes nine or more fluid pathways.

10. The battery enclosure of claim 1, wherein each of the plurality of fluid pathways of the first segment of each pair of opposing enclosure portions have a non-circular cross-sectional shape that is elongated in a direction along a length of the first segment between the distal end of the first segment and the interface.

11. The battery enclosure of claim 3, wherein the first segment of each pair of opposing L-shaped enclosure portions is longer than the second segment of each pair of opposing L-shaped enclosure portions.

12. The battery enclosure of claim 3, wherein each of the plurality of fluid pathways of the first segment of each pair of opposing L-shaped enclosure portions is aligned with an opposing fluid pathway of an opposing enclosure portion of the pair of opposing L-shaped enclosure portions; and wherein each of the plurality of fluid pathways of the first segment of each pair of opposing L-shaped enclosure portions are spaced apart from each other at regular intervals along a length of the first segment between the distal end of the first segment and the interface; and wherein the second segment of each pair of opposing L-shaped enclosure portions includes a plurality of heat exchanging fins that protrude outward from an exterior surface of the second segment.

13. The battery enclosure of claim 3, wherein each of the plurality of fluid pathways of the first segment of each pair of opposing L-shaped enclosure portions includes nine or more fluid pathways.

14. The battery enclosure of claim 3, wherein each of the plurality of fluid pathways of the first segment of each pair of opposing L-shaped enclosure portions have a non-circular cross-sectional shape that is elongated in a direction along a length of the first segment between the distal end of the first segment and the interface.

* * * * *